United States Patent
Chen et al.

(10) Patent No.: US 10,770,104 B1
(45) Date of Patent: Sep. 8, 2020

(54) ALTERNATIVE DESIGNS FOR MAGNETIC RECORDING ASSISTED BY A SINGLE SPIN HALL EFFECT (SHE) LAYER IN THE WRITE GAP

(71) Applicant: Headway Technologies, Inc., Milpitas, CA (US)

(72) Inventors: Wenyu Chen, San Jose, CA (US); Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/563,112

(22) Filed: Sep. 6, 2019

(51) Int. Cl.
| | |
|---|---|
| *G11B 5/187* | (2006.01) |
| *G11B 5/60* | (2006.01) |
| *G11B 5/48* | (2006.01) |
| *G11B 5/37* | (2006.01) |
| *G11B 5/127* | (2006.01) |
| *G11B 5/11* | (2006.01) |

(52) U.S. Cl.
CPC .............. *G11B 5/6082* (2013.01); *G11B 5/11* (2013.01); *G11B 5/1278* (2013.01); *G11B 5/187* (2013.01); *G11B 5/37* (2013.01); *G11B 5/372* (2013.01); *G11B 5/374* (2013.01); *G11B 5/4826* (2013.01)

(58) Field of Classification Search
None
See application file for complete search history.

(56) References Cited

U.S. PATENT DOCUMENTS

| | | |
|---|---|---|
| 6,785,092 B2 | 8/2004 | Covington et al. |
| 6,809,899 B1 | 10/2004 | Chen et al. |
| 6,954,340 B2 | 10/2005 | Shukh et al. |
| 7,009,812 B2 | 3/2006 | Hsu et al. |
| 7,589,600 B2 | 9/2009 | Dimitrov et al. |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., Notification date: Nov. 28, 2012, 11 pages.

(Continued)

*Primary Examiner* — William J Klimowicz
(74) *Attorney, Agent, or Firm* — Saile Ackerman LLC; Stephen B. Ackerman

(57) ABSTRACT

A Spin Hall Effect (SHE) assisted magnetic recording device is disclosed wherein a SHE layer comprising a giant Spin Hall Angle material is formed between a main pole (MP) trailing side and trailing shield (TS) bottom surface. The SHE layer may contact one or both of the MP and TS, and has a front side at the air bearing surface (ABS) or recessed therefrom. A first current ($I_1$) is applied between the MP trailing side and SHE layer and is spin polarized to generate a first spin transfer torque that tilts a local MP magnetization to a direction that enhances a MP write field. A second current ($I_2$) is applied between the SHE layer and TS and is spin polarized to generate a second spin transfer torque that tilts a local TS magnetization to a direction that increases the TS return field and improves bit error rate.

14 Claims, 17 Drawing Sheets

(56) References Cited

U.S. PATENT DOCUMENTS

| | | | |
|---|---|---|---|
| 7,724,469 B2 | 5/2010 | Gao et al. |
| 7,835,111 B2 | 11/2010 | Flint et al. |
| 7,957,098 B2 | 6/2011 | Yamada et al. |
| 7,963,024 B2 | 6/2011 | Neuhaus |
| 7,978,442 B2 | 7/2011 | Zhang et al. |
| 7,982,996 B2 | 7/2011 | Smith et al. |
| 8,027,110 B1 | 9/2011 | Yamanaka et al. |
| 8,064,244 B2 | 11/2011 | Zhang et al. |
| 8,068,312 B2 | 11/2011 | Jiang et al. |
| 8,154,825 B2 | 4/2012 | Takashita et al. |
| 8,203,389 B1 | 6/2012 | Zhou et al. |
| 8,264,792 B2 | 9/2012 | Bai et al. |
| 8,270,112 B2 | 9/2012 | Funayama et al. |
| 8,295,008 B1 | 10/2012 | Sasaki et al. |
| 8,310,787 B1 | 11/2012 | Sasaki et al. |
| 8,320,079 B2 | 11/2012 | Iwasaki et al. |
| 8,427,781 B1 | 4/2013 | Sasaki et al. |
| 8,446,690 B2 | 5/2013 | Alex et al. |
| 8,462,461 B2 | 6/2013 | Braganca et al. |
| 8,477,452 B2 | 7/2013 | Sasaki et al. |
| 8,493,687 B2 | 7/2013 | Sasaki et al. |
| 8,582,240 B1 | 11/2013 | Chen et al. |
| 8,582,241 B1 | 11/2013 | Yu et al. |
| 8,604,886 B2 | 12/2013 | Nikonov et al. |
| 8,634,163 B2 | 1/2014 | Tanabe et al. |
| 8,749,919 B2 | 6/2014 | Sasaki et al. |
| 8,767,347 B1 | 7/2014 | Sasaki et al. |
| 8,792,210 B2 | 7/2014 | de la Fuente et al. |
| 9,142,228 B2 | 9/2015 | Fujita et al. |
| 9,230,571 B1 | 1/2016 | Chen et al. |
| 9,299,367 B1 | 3/2016 | Tang et al. |
| 9,361,912 B1 | 6/2016 | Liu et al. |
| 9,406,317 B1 | 8/2016 | Tang et al. |
| 9,466,319 B1 | 10/2016 | Tang et al. |
| 9,824,701 B2 | 11/2017 | Tang et al. |
| 9,934,797 B2 | 4/2018 | Takahashi et al. |
| 9,966,091 B2 | 5/2018 | Chen et al. |
| 10,032,469 B2 | 7/2018 | Lim et al. |
| 10,037,772 B2 | 7/2018 | Okamura et al. |
| 10,079,057 B2 | 9/2018 | Ozbay et al. |
| 10,141,037 B2 | 11/2018 | Ohsawa et al. |
| 10,181,334 B1 | 1/2019 | Song et al. |
| 10,210,888 B1 | 2/2019 | Li et al. |
| 10,559,318 B1* | 2/2020 | Chen ................. G11B 5/11 |
| 10,580,441 B1* | 3/2020 | Chen ................. G11B 5/6082 |
| 2002/0034043 A1 | 3/2002 | Okada et al. |
| 2004/0150910 A1 | 8/2004 | Okada et al. |
| 2005/0128637 A1 | 6/2005 | Johnston et al. |
| 2005/0141137 A1 | 6/2005 | Okada |
| 2006/0044682 A1 | 3/2006 | Le et al. |
| 2006/0087765 A1 | 4/2006 | Iwakura et al. |
| 2006/0103978 A1 | 5/2006 | Takano et al. |
| 2007/0177301 A1 | 8/2007 | Han et al. |
| 2008/0013209 A1 | 1/2008 | Sasaki et al. |
| 2008/0088972 A1 | 4/2008 | Sasaki et al. |
| 2009/0059426 A1 | 3/2009 | Sasaki et al. |
| 2009/0080106 A1 | 3/2009 | Shimizu et al. |
| 2009/0128953 A1 | 5/2009 | Jiang et al. |
| 2009/0296275 A1 | 12/2009 | Sasaki et al. |
| 2010/0165517 A1 | 7/2010 | Araki et al. |
| 2011/0211271 A1 | 9/2011 | Ng et al. |
| 2012/0292723 A1 | 11/2012 | Luo et al. |
| 2014/0071562 A1 | 3/2014 | Chen et al. |
| 2014/0177092 A1 | 6/2014 | Katada et al. |
| 2015/0043106 A1 | 2/2015 | Yamada et al. |
| 2015/0287426 A1* | 10/2015 | Mihajlovic ............ G11B 5/374 428/816 |
| 2016/0218728 A1 | 7/2016 | Zhu |
| 2017/0133044 A1 | 5/2017 | Lim et al. |
| 2018/0075868 A1 | 3/2018 | Koui et al. |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation. ,.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

"Spin-Torque Switching with the Giant Spin Hall Effect of Tantalum," by Luqiao Liu et al., Science May 4, 2012: vol. 336, Issue 6081, pp. 555-558, DOI: 10.1126/science.1218197.

D'Yakonov, M. I., Spin Hall Effect. Int. J. Mod. Phys. B 23, 2556-2565 (2009).

"Spin-Torque Ferromagnetic Resonance Induced by the Spin Hall Effect," by Luqiao Liu et al, Physical Review Letters, PRL 106, 036601 (2011), Jan. 21, 2011, pp. 1-4.

"Surface-Assisted Spin Hall Effect in Au Films with Pt Impurities," by B. Gu et al., Physical Review Letters, PRL 105, 216401 (2010), Nov. 19, 2010, pp. 1-4.

* cited by examiner

ALTERNATIVE DESIGNS FOR MAGNETIC RECORDING ASSISTED BY A SINGLE SPIN HALL EFFECT (SHE) LAYER IN THE WRITE GAP

RELATED PATENT APPLICATIONS

This application is related to the following: U.S. Pat. No. 10,490,216; Ser. No. 16/370,613, filed on Mar. 29, 2019; Ser. No. 16/370,634, filed on Mar. 29, 2019; and, Ser. No. 16/563,147, filed on Sep. 6, 2019; assigned to a common assignee, and herein incorporated by reference in their entirety.

TECHNICAL FIELD

The present disclosure relates to a Spin Hall Effect assisted magnetic recording (SHAMR) structure wherein a Spin Hall Effect (SHE) layer comprised of a giant positive or negative Spin Hall Angle (SHA) material is formed in the write gap between a main pole (MP) and trailing shield (TS), and wherein a direct current ($I_{SHE}$) is applied from one or both of the MP and TS to the SHE layer, and then flows through the SHE layer to a lead and back to the source so that transverse spin transfer torque is applied to one or both of a local MP magnetization at the MP/SHE interface and to a local TS magnetization at the SHE/TS interface depending on SHE layer placement thereby enhancing the MP write field and TS return field, respectively, improving overwrite (OW), bit error rate (BER), and device reliability, and providing a more easily implemented process compared with SHAMR designs where $I_{SHE}$ is applied across the SHE layer and synchronized with a write current ($I_w$).

BACKGROUND

As the data areal density in hard disk drive (HDD) writing increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR) where a spin torque device is employed to generate a high frequency field that helps writing. The latter is described by J-G. Zhu et al. in "Microwave Assisted Magnetic Recording", IEEE Trans. Magn., vol. 44, pp. 125-131 (2008). A third approach called STRAMR (spin torque reversal assisted magnetic recording) relies on spin torque to reverse a magnetization in a layer in the write gap (WG), for example, to increase reluctance and force more magnetic flux from the MP at the ABS. STRAMR is described in U.S. Pat. No. 6,785,092. Related U.S. Pat. No. 10,490,216 describes a writer where the MAMR and STRAMR (spin flipping element) effects may exist simultaneously.

Spin transfer torque devices (also known as STO devices) are based on a spin-transfer effect that arises from the spin dependent electron transport properties of ferromagnetic-spacer-ferromagnetic multilayers. When current passes through a magnetic multilayer in a CPP (current perpendicular to plane) configuration, the first ferromagnetic layer (FM1) will generate spin polarized currents as the electrons traverse FM1. When the spin polarized current is transmitted through a polarization preservation spacer, the spin angular moment of electrons incident on a second FM layer (FM2) interacts with magnetic moments of FM2 near the interface between the non-magnetic spacer and FM2. Through this interaction, the electrons transfer a portion of their angular momentum to FM2. As a result, spin-polarized current can switch the magnetization direction of FM2 if the current density is sufficiently high.

Spin Hall Effect (SHE) is a physics phenomenon discovered in the mid 20$^{th}$ century, and is described by M. Dyaknov et al. in Physics Lett. A, Vol. 35, 459 (1971). Similar to a regular Hall Effect where conduction carriers with opposite charges are scattered to opposite directions perpendicular to the current density due to a certain scattering mechanism, SHE causes electrons with opposite spins to be scattered to opposite directions perpendicular to the charge current density as a result of strong spin-orbit coupling in the conducting layer. As shown in FIG. 1, electrons pass through a non-magnetic conductor 2 with strong spin orbit interaction, and electrons 3a with spin in the negative x-axis direction are deflected to the +z-axis surface 2s1 while electrons 3b with spin in the positive x-axis direction are deflected to the negative z-axis surface 2s2. SHE is quantified by the Spin Hall Angle (SHA), which is defined as the ratio of the spin current in the direction transverse to the charge current (z-axis in FIG. 1) to the charge current (y-axis direction in FIG. 1). For many years after SHE was discovered, the absolute value of SHA materials evaluated was typically less than 0.01, and SHE had very limited application in industry.

During the past 10 years, materials with substantially larger (giant) SHA have been found. B. Gu et al. in Phys. Rev. Lett. 105, 216401 (2010), and L. Liu et al. in Phys. Rev. Lett. 106, 036601 (2011) provided examples of SHA~0.07 in a Pt layer, and as large as 0.12 in a Au layer with Pt doping, and an application where giant transverse spin current is injected into an adjacent magnetic layer to induce reversal and ferromagnetic resonance by spin torque. A large but negative SHA of around −0.12 was found in β-Ta, meaning that electrons in the β-Ta layer are spin scattered in the opposite directions compared to what is shown in FIG. 1. SHE with the negative SHA material was also used to interact with an adjacent magnetic layer, and even flip a magnetization in a magnetic layer in a magnetoresistive random access memory (MRAM) device without sending a current through the magnetic tunnel junction. The aforementioned applications using SHE, or spin orbit torque (SOT) in MRAM, are typically called SOT-MRAM, and can significantly reduce the reliability concern that is generally found in conventional spin torque transfer (STT)-MRAM.

All existing designs that provide an assist to magnetic recording have advantages, but also have disadvantages including a greater number of pads per head for all assisted designs, reliability concern for TAMR, and a limited WG thickness to fit a multilayer device in both MAMR and TAMR. Furthermore, we have found that SHAMR schemes where $I_{SHE}$ is confined within the SHE layer can cause heating that leads to SHE layer protrusion up to 1-2 nm out of the ABS. Also, synchronization of $I_{SHE}$ with $I_w$ is difficult because of the required frequency in the GHz regime. Therefore, a new SHAMR scheme is desired where there is no current density threshold to initiate the assist mechanism, where $I_{SHE}$ is not confined within the SHE layer, and where the stack of layer(s) used to provide the assist is formed with fewer process steps than in existing designs where a spin torque oscillator (STO) in MAMR or STRAMR usually has three or more layers.

SUMMARY

One objective of the present disclosure is to provide a SHE assisted magnetic recording scheme that provides better overwrite (OW), bit error rate (BER), and transition sharpness compared with existing magnetic recording assist designs.

A second objective of the present disclosure is to provide the SHAMR scheme of the first objective that also enables better device reliability and requires fewer fabrication steps than for STO devices comprised of three or more layers.

A third objective of the present disclosure is to provide a SHAMR scheme that satisfies the first two objectives and also does not have a current threshold to begin the assist, and is compatible with advanced designs where write gap thickness is reduced to 10 nm or less.

A fourth objective of the present disclosure is to provide a SHAMR scheme that satisfies the first three objectives, and does not require synchronization of a write current with a current through the SHE layer, and where SHE layer protrusion is avoided during a write process.

According to a first embodiment of the present disclosure, these objectives are achieved by forming a SHE layer in a write gap, and with a bottom surface that interfaces with a portion of the MP trailing side from the ABS to a first height (h), and having a top surface that contacts a portion of the trailing shield (TS) from the ABS to a second height (h1) where h and h1 are between 10 nm and 70 nm. The SHE layer may be made of a positive giant SHA material such as Pt or a negative giant SHA material such as β-Ta, and has a front side at the ABS in preferred embodiments, or recessed from the ABS in other embodiments. Preferably, the SHE layer is comprised of a so-called giant SHA material having an absolute value for SHA that is >0.05. In all embodiments, the SHE layer has a width greater than or equal to the track width of the MP trailing side at the ABS.

When a SHE layer made of a positive giant SHA material is in the write gap, and contacts a front portion of each of the MP trailing side and TS bottom surface, a first current ($I_1$) is applied from the MP trailing side to the SHE layer, and a second current ($I_2$) is applied from the TS bottom surface to the SHE layer. $I_1$ and $I_2$ flow through the SHE layer to a backend thereof and then through a lead back to the source of the direct current. The direction of $I_1$ and $I_2$ is independent of the direction of the MP write field. However, the direction of $I_1$ and $I_2$ is reversed when the SHE layer is comprised of a negative giant SHA material. The MP trailing side at a height>h and the TS bottom surface at a height>h1 are separated from the SHE layer by a portion of the write gap to prevent shorting.

Without a current in the SHE layer, the MP has a local magnetization at the MP/SHE interface that is aligned substantially in the direction of the write gap field ($H_{WG}$) that is either toward or away from the TS depending on the transition being written. Similarly, the TS has a local magnetization at the SHE/TS interface that is substantially parallel to $H_{WG}$. When $I_1$ and $I_2$ are applied as described previously, the SHE layer spin polarizes $I_1$ proximate to the MP trailing side and thereby exerts a transverse spin transfer torque toward the MP/SHE layer interface that causes the MP local magnetization to tilt down and more towards the ABS, or up and more away from the ABS depending on the transition. Similarly, the SHE layer spin polarizes $I_2$ proximate to the TS bottom surface and generates a transverse spin transfer torque proximate to the TS/SHE layer interface that tilts the local TS magnetization up and away from the ABS, or down and toward the ABS depending on the transition. The result is a higher effective write field for better overwrite, and a higher TS return field that typically correlates to better BER. Although an Oersted field is also generated in the SHE layer at the interfaces with the MP and TS, the Oersted field is oriented orthogonal to the transverse spin transfer torque and has no effect on the magnetic recording assist provided by the SHE layer spin polarization.

In other embodiments, the write gap is formed between the SHE layer top surface and the entire TS bottom surface so that the SHE layer contacts the MP, and provides a transverse spin transfer torque only to the local MP magnetization when $I_1$ is applied from the MP to a SHE layer made of a positive giant SHA material. Alternatively, the write gap is formed between the SHE layer bottom surface and the entire MP trailing side so that the SHE layer contacts the TS, and provides a transverse spin transfer torque only to the local TS magnetization when $I_2$ is applied from the TS to a SHE layer made of a positive giant SHA material.

In yet another embodiment, the SHE layer may be comprised of at least two sub-layers made of different SHA materials in order to tune the current density in each sub-layer, and the magnitude of the resulting transverse spin transfer torque. Accordingly, there is flexibility in using two different materials to tune the spin transfer torque to the MP trailing side and TS bottom surface individually. Thus, with one or both of a larger $I_1$ and $I_2$, and a larger absolute value for SHA, the amount of transverse spin torque applied to the local MP magnetization and to the local TS magnetization, respectively, is increased.

A process sequence is provided for forming a SHE layer having a top surface contacting the trailing shield and a bottom surface that forms an interface with a MP trailing side.

DETAILED DESCRIPTION

Figure 1:
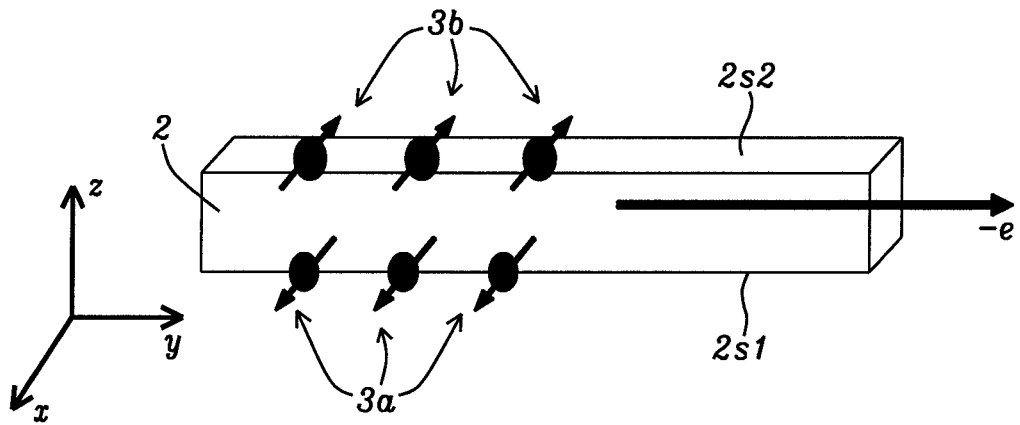
FIG. 1 is an oblique view of a conductor made of a Spin Hall Effect material where electrons with spin in the (−) x-axis direction are deflected to the (+) z-axis surface, and electrons with spin in the (+) x-axis direction are deflected to the (−) z-axis surface.

The present disclosure is a PMR writer based on SHAMR technology hereinafter referred to as a SHAMR device wherein a SHE layer is formed between a MP trailing side and a trailing shield and is configured to apply transverse spin transfer torque to one or both of local MP magnetization and a local TS magnetization during a write process to enhance write field, and TS return field, respectively. A (+) SHE layer is comprised of a giant positive SHA material, and a (−) SHE layer is comprised of a giant negative SHA material. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance orthogonal to the ABS in the x-axis direction. In some of the drawings, a magnetic bit is considerably enlarged over actual size in order to more easily depict a bit magnetization therein. The terms "magnetic moment" and "magnetization" may be used interchangeably.

The term "down" with respect to MP field direction indicates a direction out of the ABS toward the magnetic medium, and the term "up" refers to a direction opposite to "down", which is into the MP from the magnetic medium. A front side of a layer is at the ABS or faces the ABS while a backside of a layer faces away from the ABS.

Figure 2:
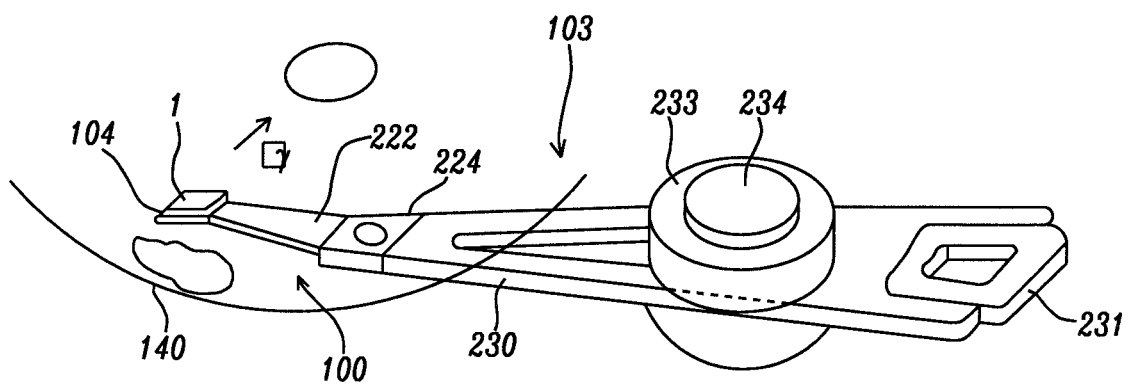
FIG. 2 is a perspective view of a head arm assembly of the present disclosure.

Referring to FIG. 2, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 3:
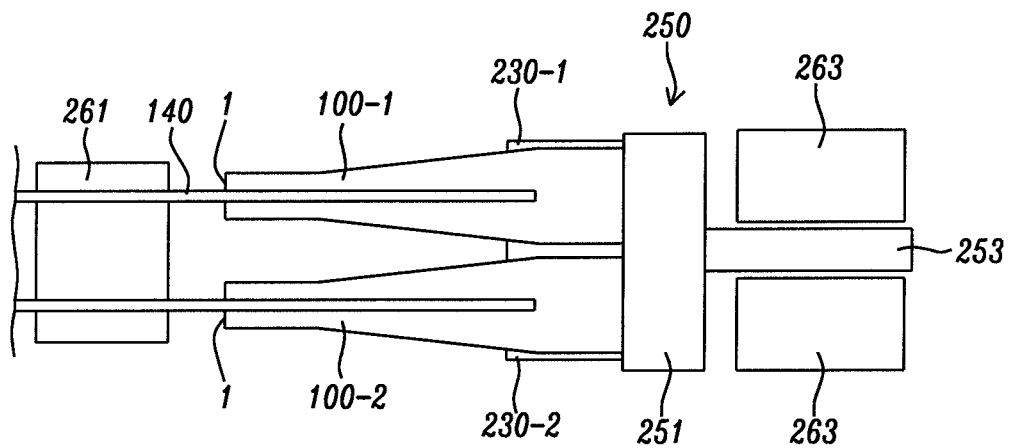
FIG. 3 is side view of a head stack assembly of the present disclosure.

Next, a side view of a head stack assembly (FIG. 3) and a plan view of a magnetic recording apparatus (FIG. 4) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 2) of the voice coil motor is mounted at the opposite side of each arm in carriage 251. The voice coil motor has a permanent magnet 263 arranged at an opposite position across the coil 231.

Figure 4:
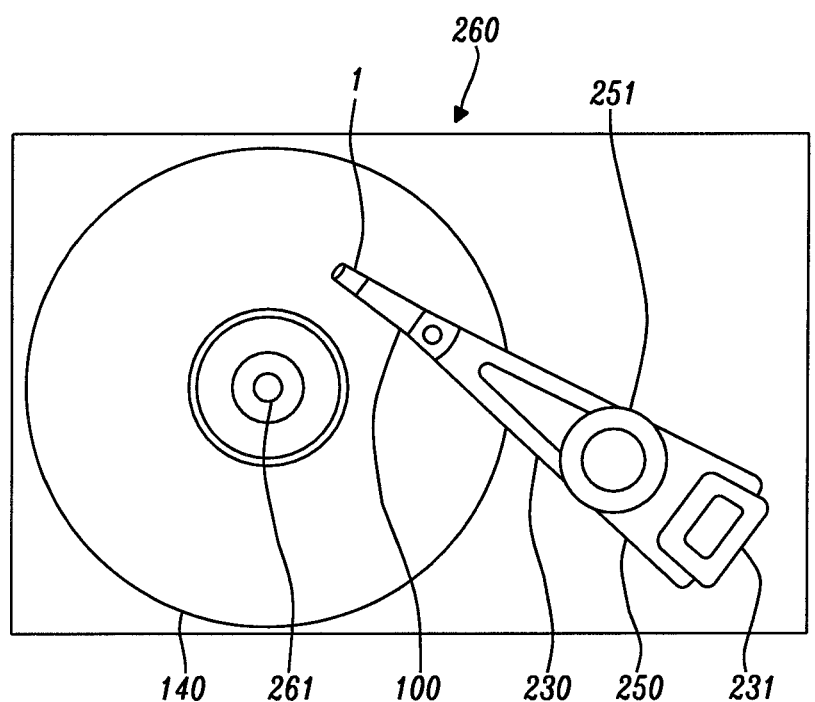
FIG. 4 is a plan view of a magnetic recording apparatus of the present disclosure.

With reference to FIG. 4, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 5:
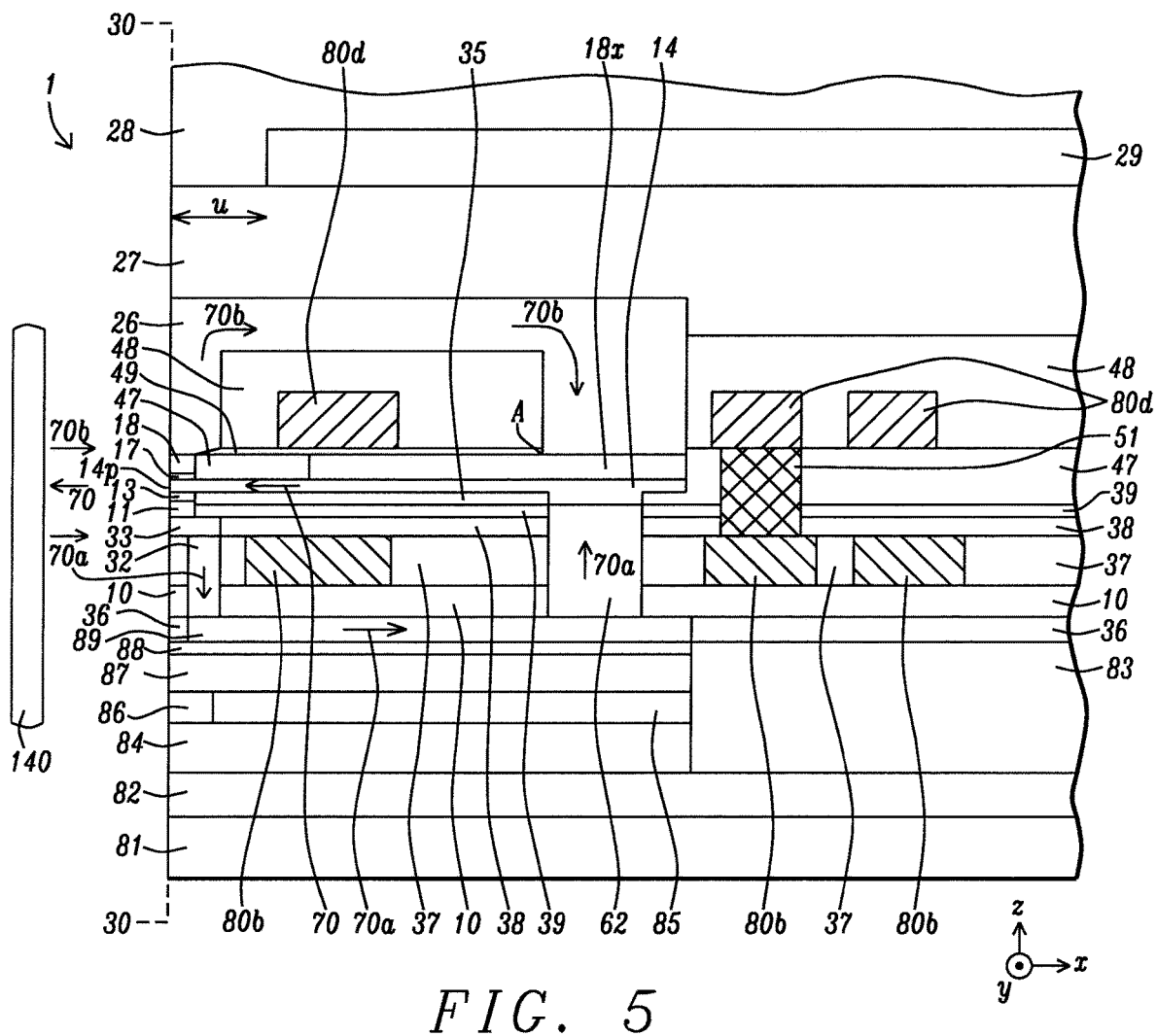
FIG. 5 is a down-track cross-sectional view of a combined read-write head with leading and trailing loop pathways for magnetic flux return to the main pole according to an embodiment of the present disclosure.

Referring to FIG. 5, magnetic recording head 1 comprises a combined read-write head. The down-track cross-sectional view is taken along a center plane (44-44 in FIG. 6A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head (SHAMR writer) may be employed with the read head portion. In the exemplary embodiment, magnetic flux 70 in main pole (MP) layer 14 is generated with flowing a current called $I_w$ (not shown) through bucking coil 80b and driving coil 80d that are below and above the MP layer, respectively, and are connected by interconnect 51. Magnetic flux 70 exits the MP layer at pole tip 14p at the ABS 30-30 and is used to write a plurality of bits on magnetic media 140. Magnetic flux 70b returns to the main pole through a trailing loop comprised of trailing shield 17, write shield 18, PP3 shield 26, and top yoke 18x. There is also a leading return loop for magnetic flux 70a that includes leading shield 11, leading shield connector (LSC) 33, S2 connector (S2C) 32, return path 89, and back gap connection (BGC) 62. Alternatively, in a non-dual write shield (nDWS) design (not shown), the LSC, S2C, return path and BGC are omitted such that the leading return loop terminates at the leading shield. The magnetic core may also comprise a bottom yoke 35 below the MP layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 6A:
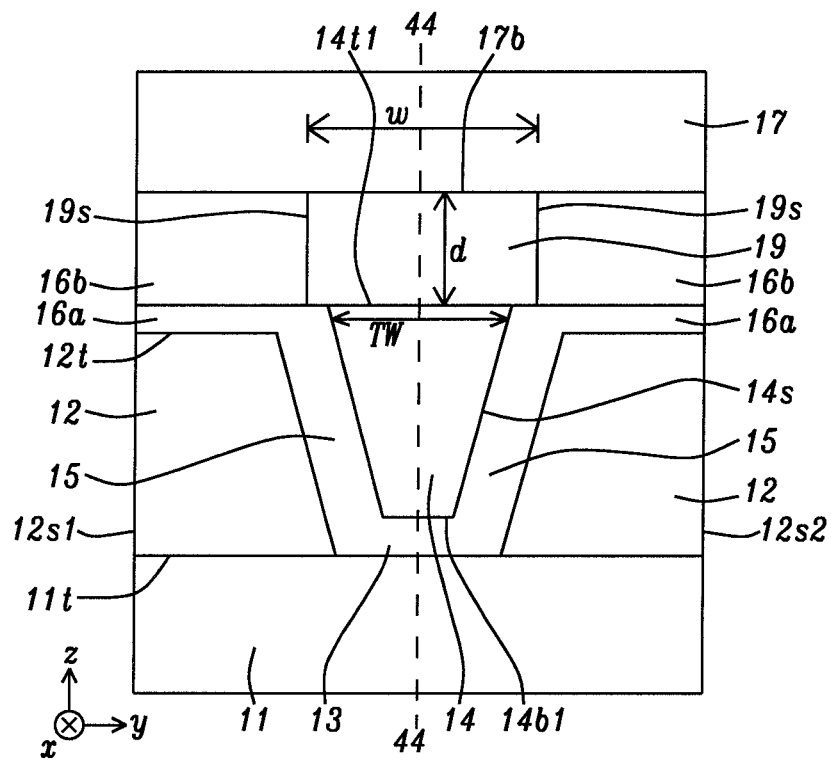
FIG. 6A is an ABS view of a PMR writer according to an embodiment of the present disclosure where a (+) SHE layer is formed in the write gap and has a top surface contacting a TS, and a bottom surface adjoining the MP trailing side.

Referring to FIG. 6A, an ABS view of the SHAMR write head structure proximate to MP 14 is depicted according to a first embodiment of the present disclosure. There is a side gap 15 adjoining MP side 14s on each side of center plane 44-44. Each side shield (SS) 12 has an inner side adjoining a side gap, and an outer side 12s1 or 12s2. A first write gap (WG) layer 16a is formed on SS top surface 12t, and has a top surface coplanar with a front edge of MP trailing side 14t1 at the ABS. Leading shield 11 has top surface 11t contacting a bottom of each side shield, and a bottom of lead gap 13. The lead gap fills the space between MP leading side 14b1 and the leading shield. A key feature is (+) SHE layer 19 formed on the MP trailing side, and on WG layer 16a on each side of the center plane. The SHE layer has a thickness d less than or equal to the WG thickness, and a width w from 30 nm to 150 nm that is greater than or equal to the track width (TW) of the MP trailing side at the ABS. Trailing shield (TS) 17 has a bottom surface 17b contacting a top surface of the SHE layer that is bisected by the center plane. A second WG layer 16b is formed on WG layer 16a, and adjoins the SHE layer sides 19s and TS bottom surface 17b.

Figure 6B:
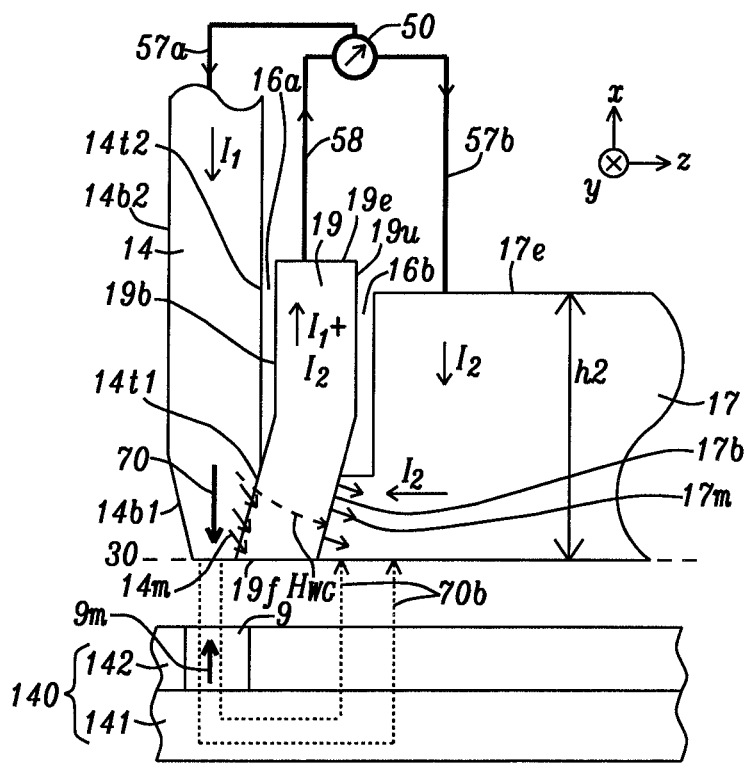
FIG. 6B is a down-track cross-sectional view at the center plane in FIG. 6A.

As shown in FIG. 6B, MP 14 has a sufficiently large magnetic (write) field 70 to write a media bit 9 with magnetization 9m on medium 140. In a normal write process, the MP needs to be driven with a coil current so that the MP write field 70 is pointing down to overwrite a medium bit 9 pointing up. Magnetic flux in the MP write field proceeds from the MP through the ABS 30-30 and into medium bit layer 142 and soft underlayer (SUL) 141. A portion of the flux 70b is collected by trailing shield 17 and then returns to the MP through a trailing loop (shown in FIG. 5). SHE layer 19 has a front side 19f at the ABS, and a portion of SHE layer bottom surface 19b proximate to the ABS is formed on the MP tapered trailing side 14t1, which connects with a MP top surface 14t2 that is aligned orthogonal to the ABS. The remainder of the SHE layer bottom surface is separated from the MP by lower WG layer 16a to prevent shorting. The SHE layer also has a portion of top surface 19u that adjoins TS bottom surface 17b while the remainder of the SHE layer top surface is separated from the TS by upper WG layer 16b to avoid shorting.

The MP leading side 14b1 is generally tapered and connects with the MP bottom surface 14b2. In other embodiments (not shown), one or both of the MP leading side and trailing side 14t1 are orthogonal to the ABS. Write gap field $H_{WG}$ is shown across the SHE layer in a direction from the MP 14 to TS 17. A local MP field 14m proximate to MP trailing side 14t1, and a local TS field 17m proximate to the TS bottom surface are pointing substantially in the same direction as $H_{WG}$.

The benefits of the SHE layer according to the present disclosure are realized when a first current $I_1$ of sufficient current density flows from direct current (dc) source 50 through lead 57a and MP 14 and into SHE layer 19 before returning through lead 58 to the dc source. Moreover, a second current $I_2$ of sufficient current density flows from the dc source through lead 57b and TS 17, and into the SHE layer before returning through lead 58 to the dc source. In the exemplary embodiment, a backside 19e of the SHE layer is at a greater height from the ABS 30-30 than a throat height h2 of TS backside 17e. In other embodiments (not shown), the SHE layer backside may be less than h2 from the ABS.

Figure 7A:
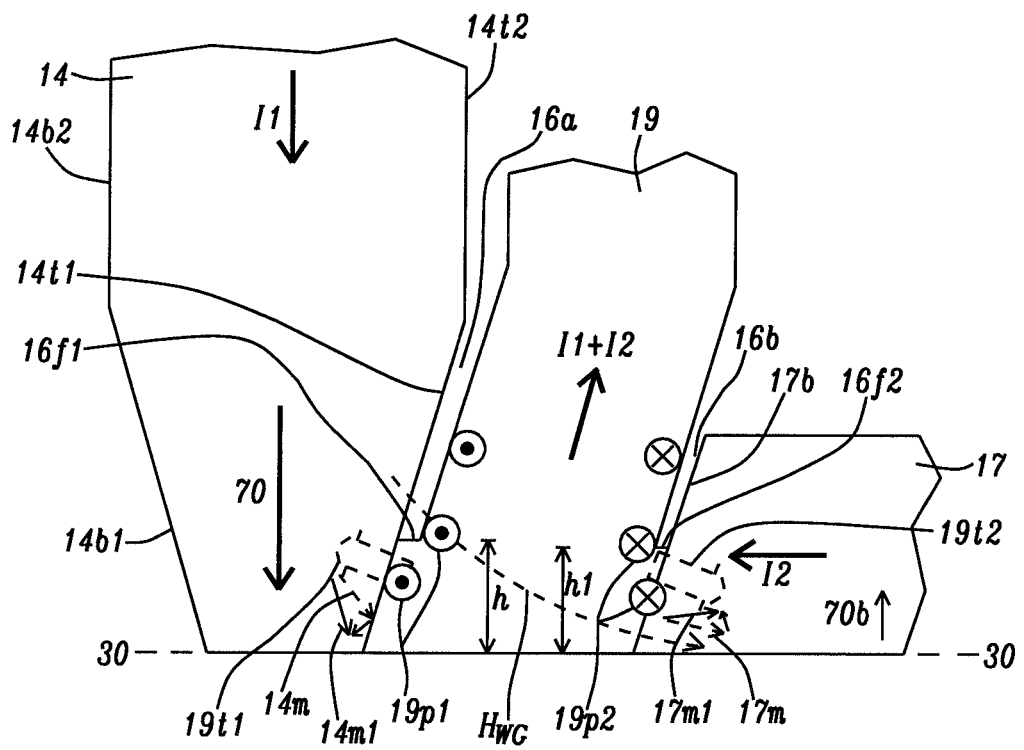
FIG. 7A and FIG. 7B show a transverse spin transfer torque applied to a MP magnetization and to a TS magnetization at interfaces with a positive giant SHE layer when a current is applied from the MP to the SHE layer and from the TS to the SHE layer, respectively, according to an embodiment of the present disclosure.

In FIG. 7A, a down-track cross-sectional view of the PMR writer in FIGS. 6A-6B is shown to further illustrate the benefits of conducting current $I_1$ and $I_2$ through a SHE layer 19 made of a positive giant SHA material. An important feature is that the direction $I_1$ of is from MP 14 to the SHE layer, and the direction of $I_2$ is from TS 17 to the SHE layer when the MP write field is pointing down (out of the ABS 30-30). Also, a front side 16f1 of lower WG layer 16a is recessed to height h from the ABS, and a front side 16f2 of upper WG layer 16b is recessed to height h1 where both of h and h1 are from 10 nm to 70 nm. As a result $I_1$, of the direction of spin polarized electrons 19p1 proximate to MP trailing side 14t1 is out of the plane of the paper and is responsible for generating transverse spin transfer torque 19t1 that is substantially orthogonal to MP trailing side 14t1 and pointing toward the MP. The transverse spin transfer torque 19t1 causes local MP magnetization 14m to tilt and become MP magnetization 14m1 that is oriented more towards the ABS (and more parallel to write field 70). Accordingly, the write field is enhanced and requires a lower write current to switch a bit magnetization 9m described earlier. Thus, the SHE layer provides an assist to the magnetic recording process.

Meanwhile, as a result of $I_2$, the direction of spin polarized electrons 19p2 proximate to TS bottom surface 17b is into the plane of the paper, and is responsible for generating transverse spin transfer torque 19t2 that is substantially orthogonal to TS bottom surface 17b and pointing toward TS 17. The transverse spin transfer torque 19t2 causes local TS magnetization 17m to tilt and become TS magnetization 17m1 that is oriented more away from the ABS (and more parallel to return field 70b shown in FIG. 6B). The resulting increase in TS return field is another form of a SHE assist and typically correlates to improved BER.

The mechanism for each SHE assist is similar to that described in FIG. 1. Conduction electrons in $I_1$ and $I_2$ that carry spin downward propagate to the MP trailing side 14t1, and conduction electrons with upward spin propagate to the TS bottom surface 17b. The spin angular momentum of the downward spin current interacts with the local MP magnetization 14m as depicted by transverse spin transfer torque 19t1. Meanwhile, spin angular momentum of the upward spin current interacts with local TS magnetization 17m as shown by transverse spin transfer torque 19t2. Another advantage is that the SHE layer rise time of around 1 picosecond to tens of picoseconds is substantially shorter than the writer's rise time. Therefore, the PMR writer transition speed will be significantly improved with the SHE assist as described with respect to FIG. 16 in a later section. The write pattern's transition sharpness and overwrite will also be improved.

Preferably, SHE thickness d depicted in FIG. 6A is <12 nm since the L. Liu reference mentioned earlier indicates that a SHE assist (transverse spin torque applied to an adjacent magnetic layer) is reduced when the giant SHA material has a thickness >12 nm. Since current WG thicknesses are often greater than 12 nm, an alternative SHE layer structure is proposed in related U.S. application Ser. No. 16/563,147 where two SHE layers are formed in the WG and are separated by a dielectric layer of at least 3 nm in thickness. Accordingly, a SHE assist to magnetic recording is provided by two SHE layers each with a thickness <12 nm that are effective for a WG thickness of 12 nm or more.

Figure 7B:
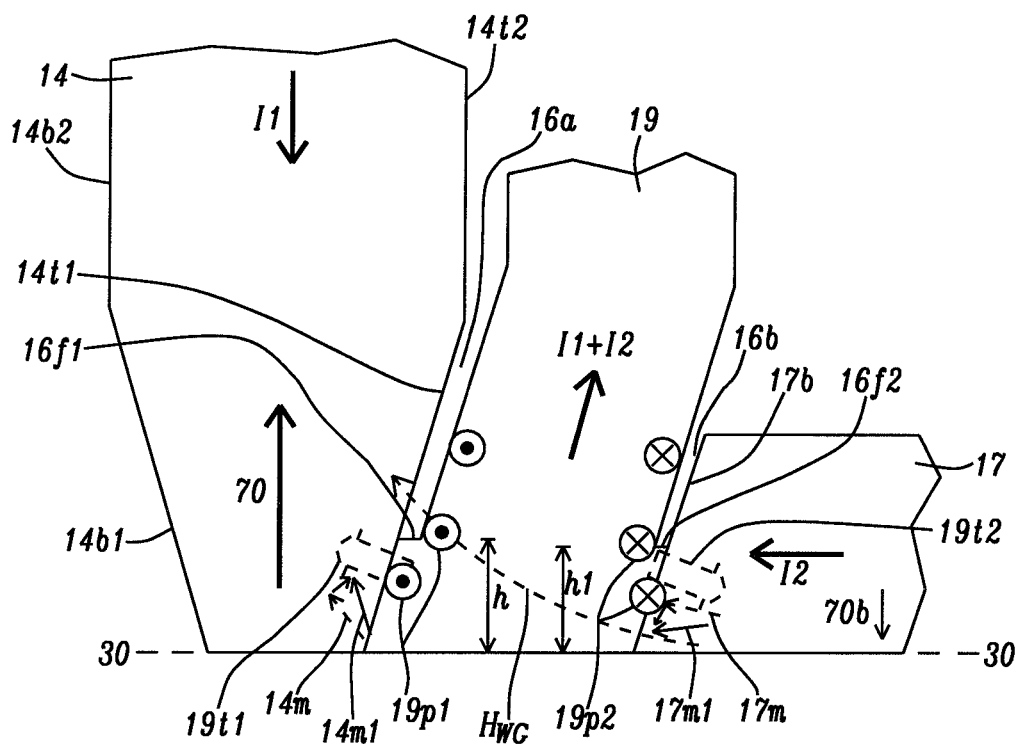

Referring to FIG. 7B, when a transition is being written where the write field 70 is pointing up (away from the ABS) in order to switch a bit magnetization pointing down (not shown), the direction of $I_1$ and $I_2$ remain the same as in FIG. 7A. In other words, regardless of write current polarity that determines the MP write field direction, currents $I_1$ and $I_2$ in the SHE layer remain constant and are maintained from the MP and TS, respectively, into the SHE layer. Again, spin polarized electrons 19p1 proximate to MP trailing side 14t1 are responsible for generating transverse spin transfer torque 19t1 that is substantially orthogonal to MP trailing side 14t1 and pointing toward the MP. In this case, transverse spin transfer torque 19t1 causes local MP magnetization 14m to tilt and become MP magnetization 14m1 that is oriented more away the ABS (and more parallel to write field 70). Thus, the write field is enhanced and provides the same benefits as in the previous embodiment. Furthermore, spin polarized electrons 19p2 proximate to TS bottom surface 17b are responsible for generating transverse spin transfer torque 19t2 that is substantially orthogonal to TS bottom surface 17b and pointing toward TS 17. The transverse spin transfer torque 19t2 causes local TS magnetization 17m to tilt and become TS magnetization 17m1 that is oriented more toward the ABS (and more parallel to return field 70b). The resulting increase in TS return field improves BER as mentioned previously.

The local moment of the MP 14 (and TS 17) that receives the spin torque interactions follows the Landau-Lifshitz-Gilbert (LLG) equation (shown below) plus the spin torque with spin polarized by the SHE layer 19.

$$\frac{d\hat{m}}{dt} = -\gamma\hat{m} \times \overrightarrow{B_{eff}} + \alpha\hat{m} \times \frac{d\hat{m}}{dt} - \gamma\frac{hJ_S}{4\pi eM_S t}(\hat{m} \times \hat{m} \times \hat{\sigma})$$

$$= -\gamma\hat{m} \times \left(\overrightarrow{B_{eff}} + \frac{hJ_S}{4\pi eM_S t}\hat{m} \times \hat{\sigma}\right) + \alpha\hat{m} \times \frac{d\hat{m}}{dt}$$

In the equation above, $\hat{m}$ is the unit vector of the local magnetic moment, $\hat{\sigma}$ is the unit vector of the injected spin polarization, y is the gyromagnetic ratio, $\alpha$ is the damping parameter, and t is the effective depth by which the spin transfer torque occurs in the MP and TS, typically several atomic layers. After the first equality sign "=", the first term is the precession along the total magnetic field vector $B_{eff}$, and the second is the damping term. The last term is the spin torque term which can be merged to the first term so that $$\frac{hJ_S}{4\pi eM_S t}\hat{m} \times \hat{\sigma}$$

functions like me additional effective field to tilt local MP magnetization 14m to 14m1 and to tilt local TS magnetization 17m to 17m1, which work together with the magnetic fields 70, 70b, respectively. Js is the spin current density, and Ms is the magnetization density of the MP and TS where the spin current is injected. A MP layer (not shown) adjoining MP trailing side 14t1 and a TS layer (not shown) adjoining the TS bottom surface 17b each have a magnetization that is rotated by the additional effective field. The rotation is then propagated to the effective depth mentioned above through magnetic exchange interactions.

Unlike a current threshold requirement for assist effects to occur with SOT-MRAM or STT-MRAM, there is no current threshold for $I_1$ and $I_2$ to begin an assist in the SHAMR embodiments of the present disclosure. This advantage is related to the fact that injected spin current from MP 14 and TS 17 to the SHE layer (or in the reverse direction in other embodiments) always carries spin direction parallel to the MP/SHE and SHE/TS interfaces and is substantially orthogonal to the local MP magnetization 14m and local TS magnetization 17m, respectively. The magnitude of the transverse spin transfer torque increases as $I_1$ and $I_2$ are increased. A maximum SHE assist occurs when local MP magnetization 14m1 is parallel to MP trailing side 14t1, and when local TS magnetization 17m1 is parallel to TS bottom surface 17b. There is no risk of an over-push situation where local MP and local TS magnetizations are tilted beyond a position that is parallel to the MP trailing side and to the TS bottom surface, respectively.

Figure 8A:
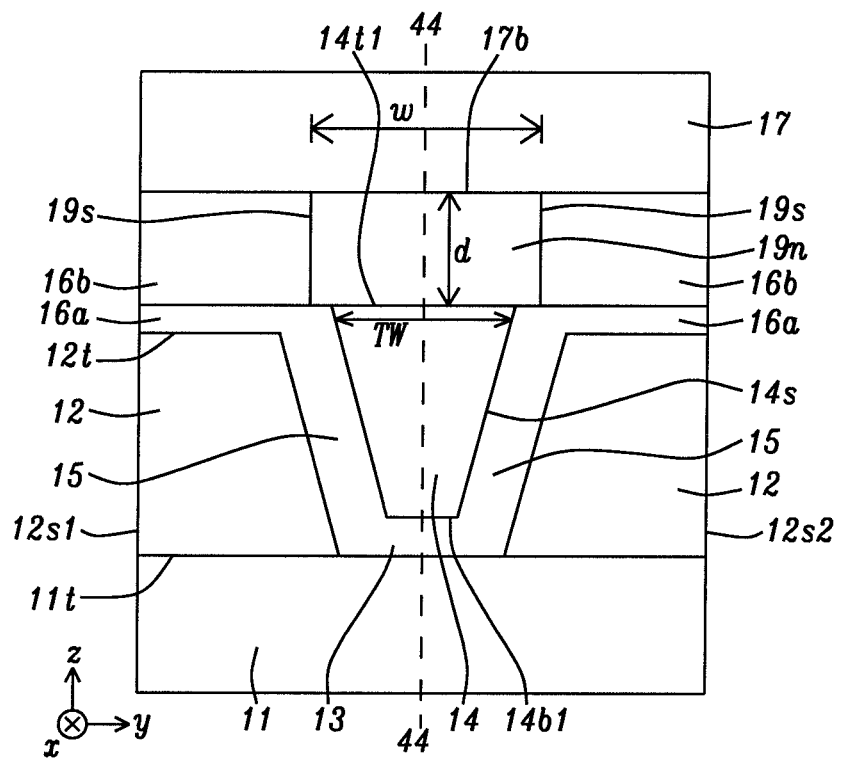
FIG. 8A is an ABS view of a PMR writer according to an embodiment of the present disclosure where a (−) SHE layer is formed in the write gap and has a top surface contacting a TS, and a bottom surface adjoining the MP trailing side.
Figure 8B:
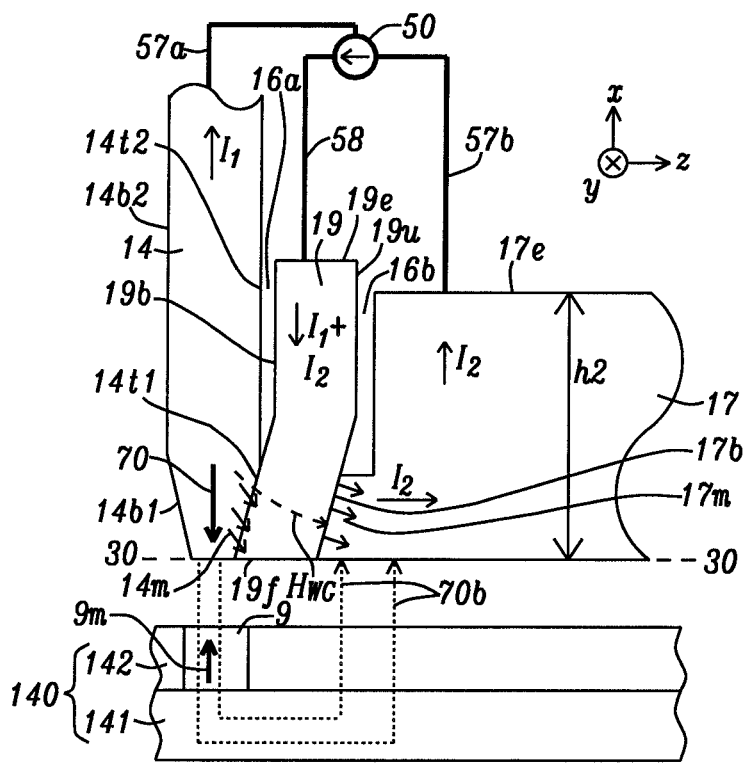
FIG. 8B is a down-track cross-sectional view at the center plane in FIG. 8A.

Referring to FIGS. 8A-8B, the present disclosure also encompasses an embodiment where SHE layer 19 is replaced with SHE layer 19n that is made of a negative giant SHA material. All other features of the embodiments shown in FIGS. 7A-7B are retained in FIGS. 8A-8B. The same advantageous results of enhanced write field 70 and better TS return field 70b associated with the previous embodiment is achieved with SHE layer 19n. However, $I_1$ and $I_2$ must be applied through SHE layer 19n in direction opposite to what is shown for SHE layer 19. In particular, when MP write field 70 is out of the ABS 30-30 and toward a magnetic medium as indicated in FIG. 8B, $I_1$ and $I_2$ flow from dc source 50 through lead 58 and through SHE layer 19n toward the ABS. $I_1$ returns to the source through MP 14 and lead 57a while $I_2$ returns to the dc source through TS 17 and lead 57b.

Figure 9A:
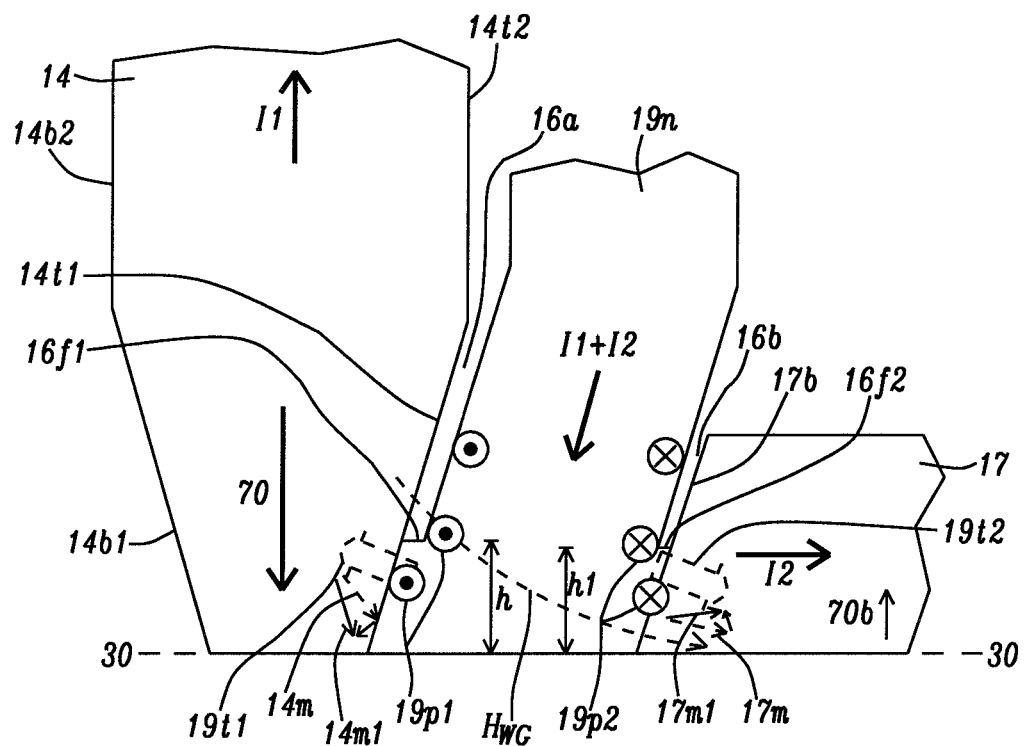
FIG. 9A and FIG. 9B show a transverse spin transfer torque applied to a MP magnetization and to a TS magnetization at interfaces with a negative giant SHE layer when a current is applied from the SHE layer to the MP and to the TS, respectively, according to an embodiment of the present disclosure.

As shown in FIG. 9A, transverse spin transfer torque 19t1 is generated by spin polarized electrons 19p1 in SHE layer 19n proximate to MP trailing side 14t1, and tilts local MP magnetization 14m downward to become local MP magnetization 14m1 that is more parallel to MP write field 70 and thereby enhancing the write field. Meanwhile, transverse spin transfer torque 19t2 is generated by spin polarized electrons 19p2 in the SHE layer proximate to TS bottom surface 17b, and tilts local TS magnetization 17m upward to become local TS magnetization 17m1 that reinforces TS return field 70b.

Figure 9B:
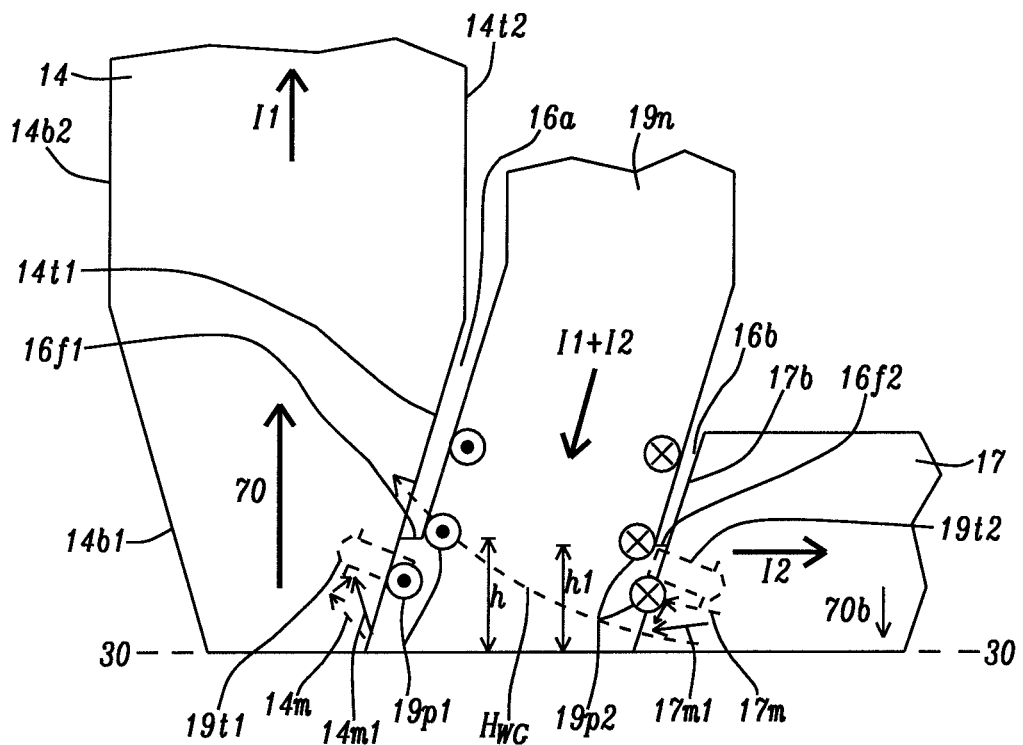

FIG. 9B is an alternative embodiment where a transition involves MP write field pointing down to switch a bit magnetization pointing up (not shown). The $I_1$ and $I_2$ pathways are maintained from FIG. 9A with the result of a tilt upward in local MP magnetization 14m to give magnetization 14m1 that is more parallel to the MP write field, and a tilt downward in TS magnetization 17m to yield magnetization 17m1 that is more parallel to TS return field 70b as a result of transverse spin transfer torque 19t1, 19t2, respectively.

Figure 10A:
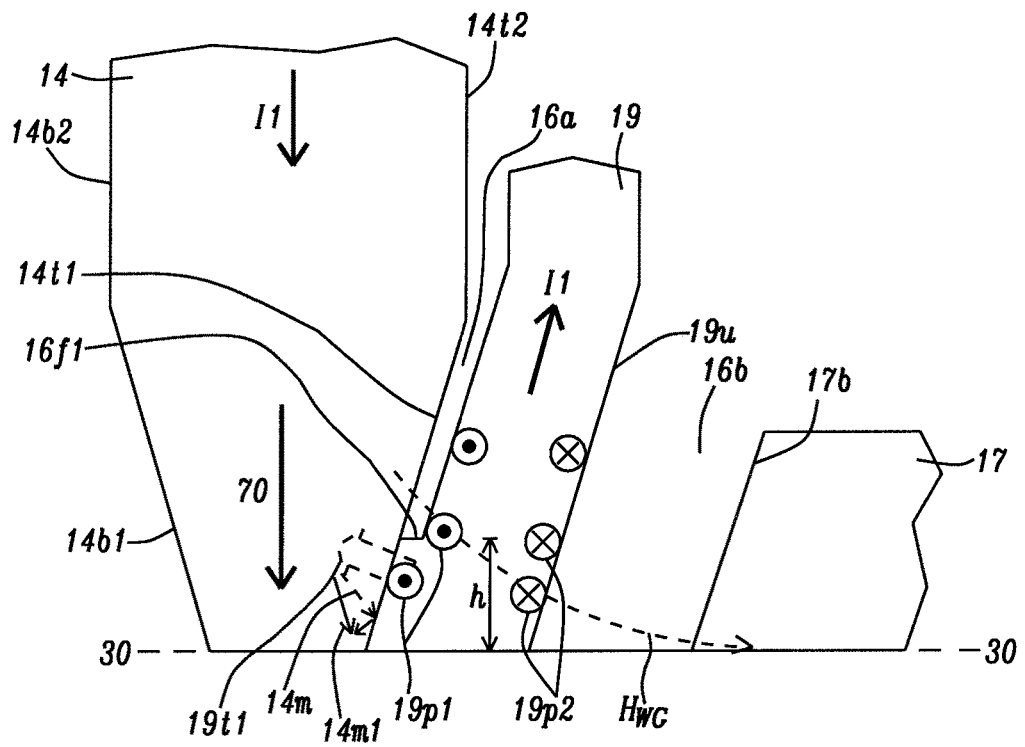
FIG. 10A and FIG. 10B are alternative embodiments to FIG. 7A and FIG. 7B, respectively, where the (+) SHE layer adjoins a portion of the MP trailing side but is separated from the TS by the write gap so that transverse spin transfer torque is applied only to a local MP magnetization at the interface with the SHE layer.
Figure 10B:
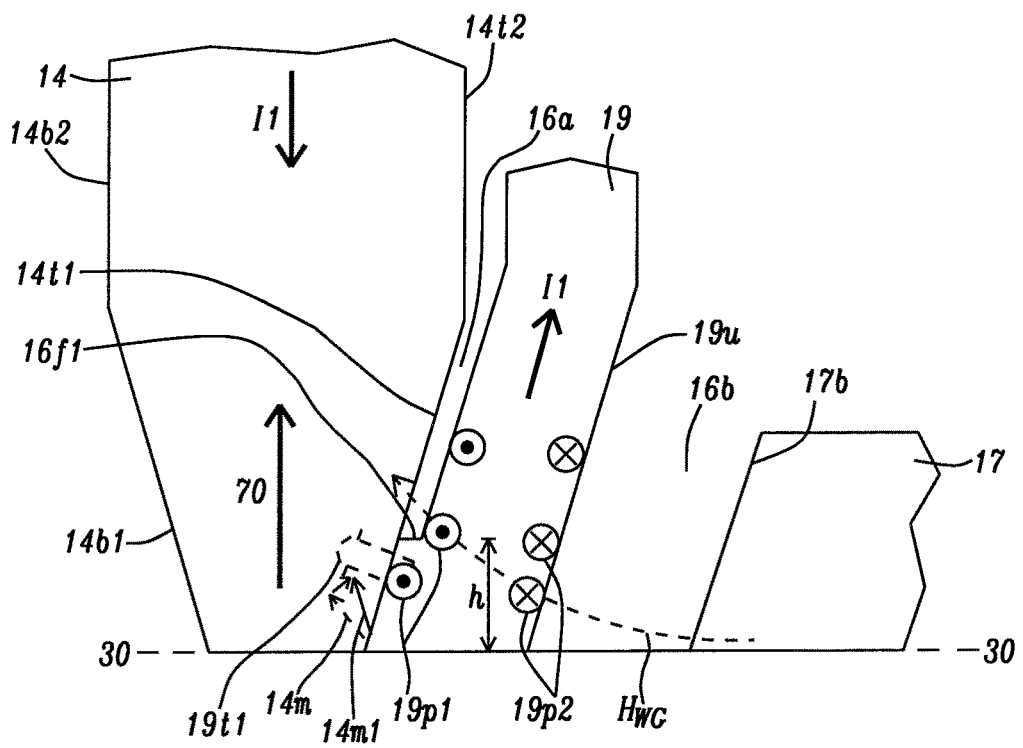

Referring to FIGS. 10A-10B, all aspects of the embodiment shown in FIGS. 7A-7B are retained except the thickness of SHE layer 19 is reduced to be less than that of the WG, and where upper WG layer 16b completely separates SHE layer top surface 19u from TS bottom surface 17b. Meanwhile, a front portion of SHE layer bottom surface 19b continues to contact MP trailing side 14t1 proximate to ABS 30-30 to enable $I_1$ to flow from MP 14 to the SHE layer before returning to the direct current source. For example, when the WG has a down-track thickness substantially larger than 12 nm, SHE layer 19 with a thickness <12 nm still enables a considerable SHE assist to enhance MP write field 70 by generating transverse spin transfer torque 19t1 described previously. However, there is no transverse spin transfer torque applied to the TS 17. The MP write field may be pointing down and toward the ABS as in FIG. 10A, or may be pointing up and away from the ABS during a transition as depicted in FIG. 10B but the direction of $I_1$ remains constant.

Figure 11A:
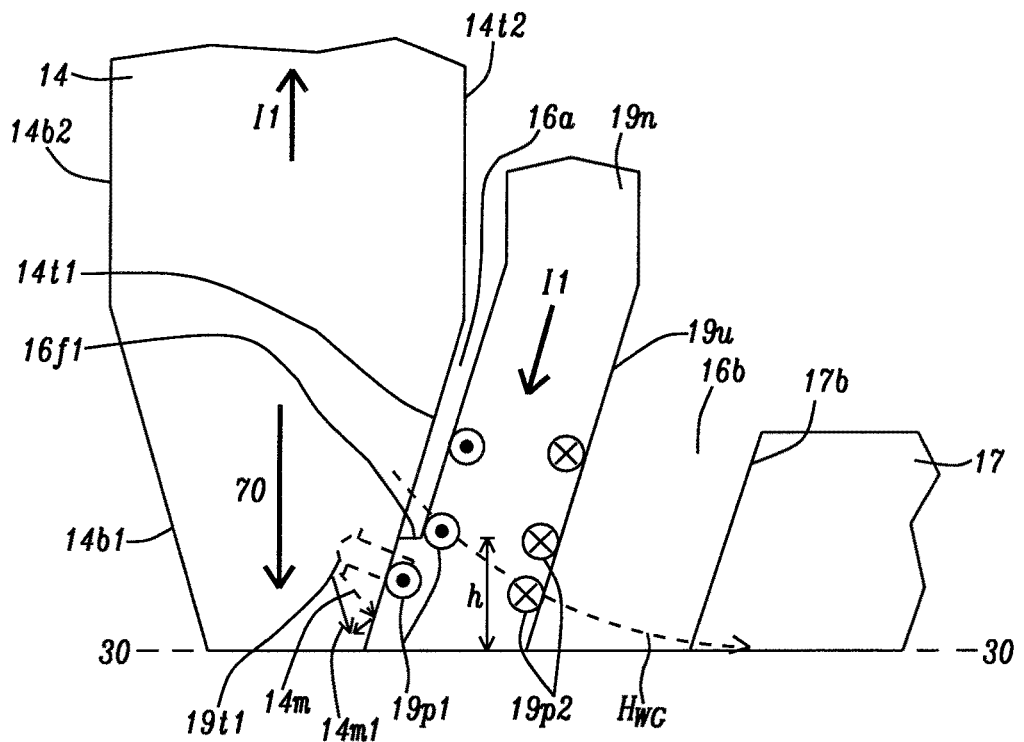
FIG. 11A and FIG. 11B are alternative embodiments to FIG. 9A and FIG. 9B, respectively, where the (−) SHE layer adjoins a portion of the MP trailing side but is separated from the TS by the write gap so that transverse spin transfer torque is applied only to a local MP magnetization at the interface with the SHE layer.
Figure 11B:
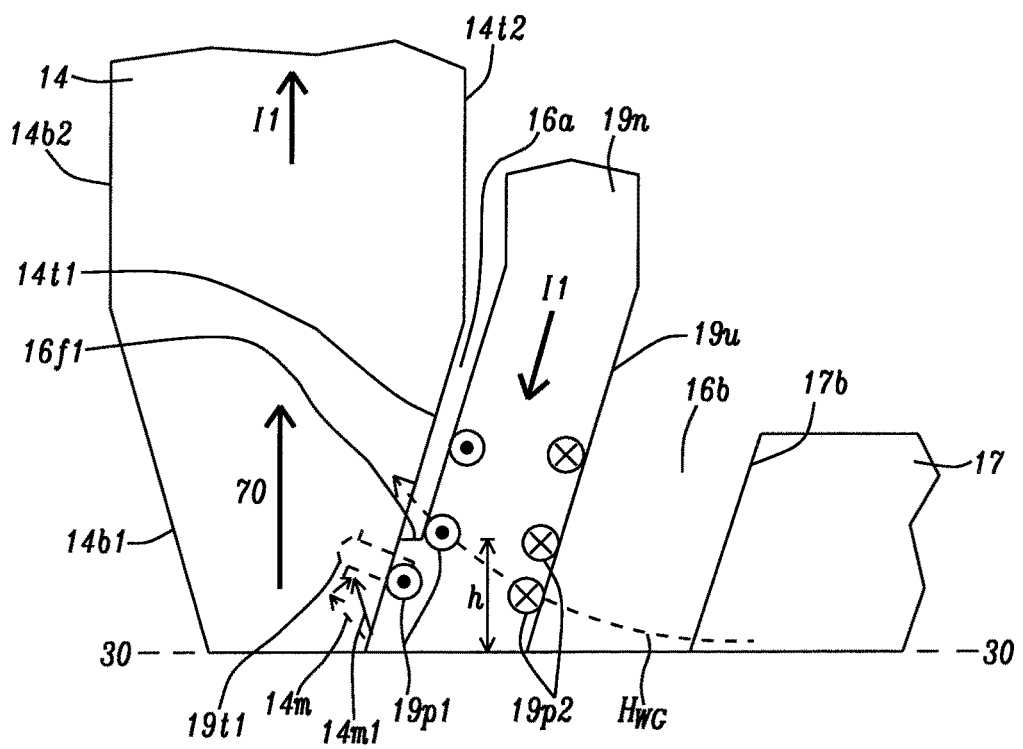

Referring to FIGS. 11A-11B, the present disclosure also encompasses an embodiment where SHE layer 19 is replaced with SHE layer 19n that is made of a negative giant SHA material. All other features of the embodiments shown in FIGS. 10A-10B are retained in FIGS. 11A-11B. With regard to FIG. 11A, $I_1$ is applied through SHE layer 19n in direction opposite to what is shown for SHE layer 19 in FIG. 10A. The current direction for $I_1$ is maintained in FIG. 11B compared with FIG. 11A even though the direction of write field 70 is changed to up (away from the ABS). There is no transverse spin transfer torque applied to TS 17 since upper WG layer 16b completely separates SHE layer top surface 19u from TS bottom surface 17b, and prevents any spin polarized current from flowing to the TS. $I_1$ returns to the dc source (not shown) through MP 14 and lead 57a in both FIG. 11A and FIG. 11B. Thus, only write field 70 is enhanced and there is no assist to boosting the return field 70b.

In all embodiments, WG layers 16a, 16b may be a single layer or multilayer including but not limited to AlOx, SiOx, MgO, AlNx, TiOx, and other insulating oxides, oxynitrides, or nitrides used in the art.

Figure 12A:
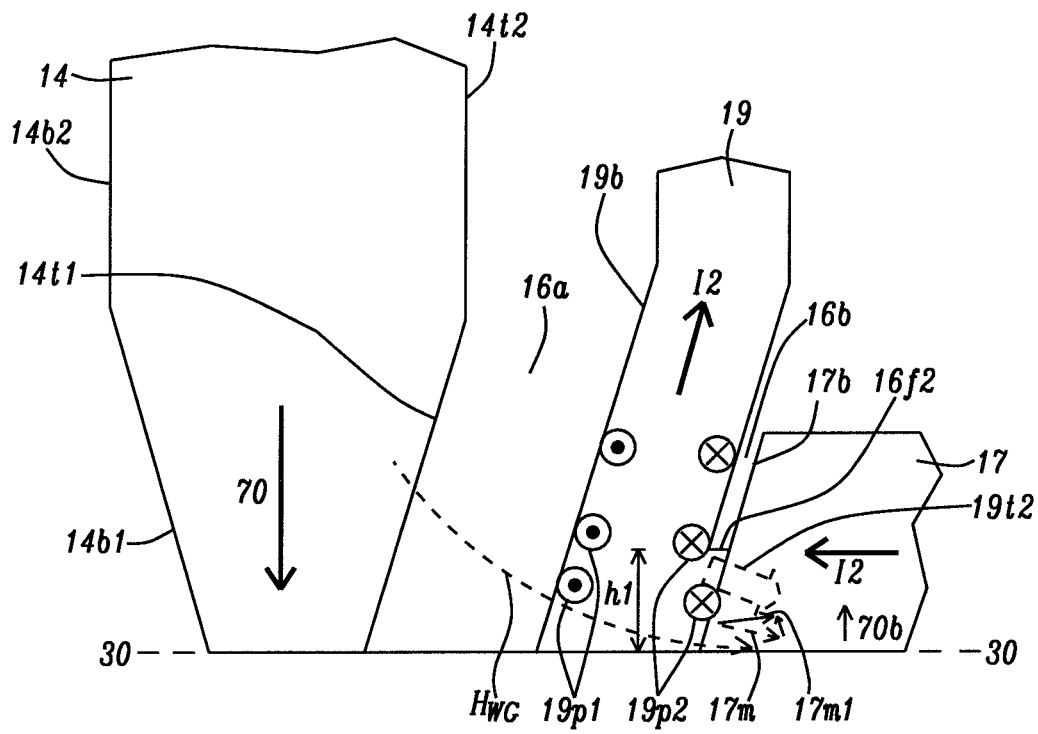
FIG. 12A and FIG. 12B are alternative embodiments to FIG. 7A and FIG. 7B, respectively, where the (+) SHE layer adjoins a portion of the TS but is separated from the MP by the write gap so that transverse spin transfer torque is applied only to a local TS magnetization at the interface with the SHE layer.
Figure 12B:
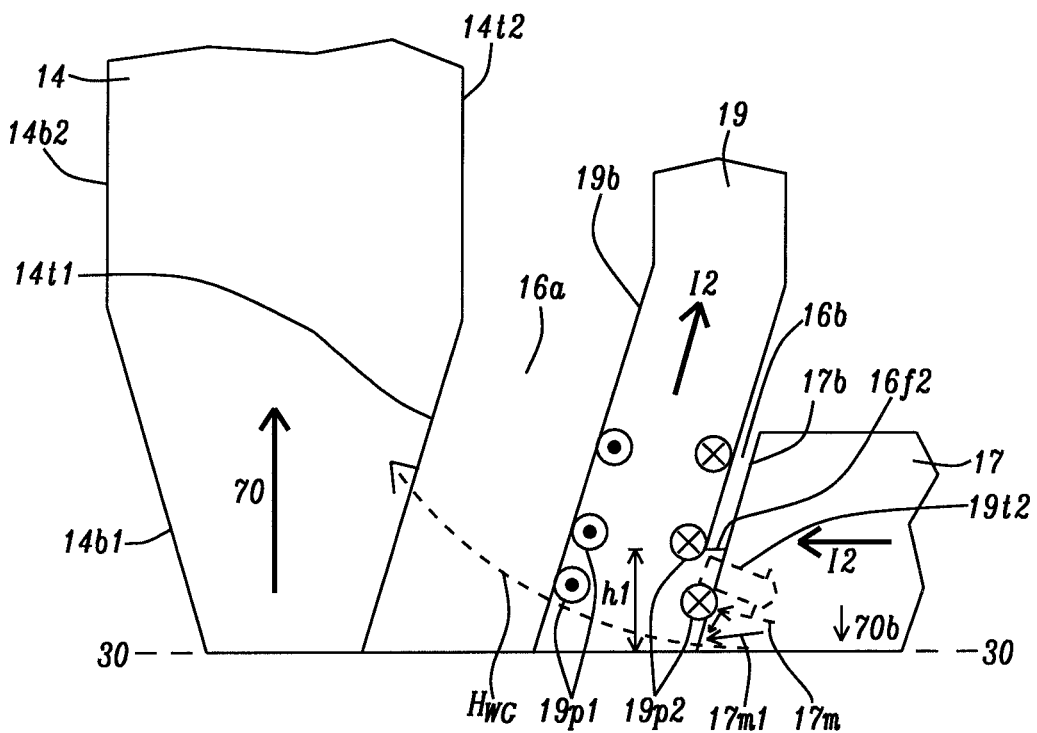

Referring to FIGS. 12A-12B, all aspects of the embodiment shown in FIGS. 7A-7B are retained except the thickness of SHE layer 19 is reduced to be less than that of the WG, and where lower WG layer 16a completely separates SHE layer bottom surface 19b from MP trailing side 14t1. Meanwhile, a front portion of SHE layer top surface 19u continues to contact TS bottom surface 17b proximate to ABS 30-30 to enable $I_2$ to flow from TS 17 to the SHE layer before returning to the dc source. This embodiment is especially applicable when the WG has a down-track thickness substantially larger than 12 nm. Accordingly, SHE layer 19 with a thickness <12 nm still enables a considerable SHE assist to enhance TS return field 70b by generating transverse spin transfer torque 19t2 described earlier. However, there is no transverse spin transfer torque applied to MP 14. The TS return field may be pointing up and away from the ABS as in FIG. 12A, or may be down and toward from the ABS during a transition as depicted in FIG. 12B.

Figure 13A:
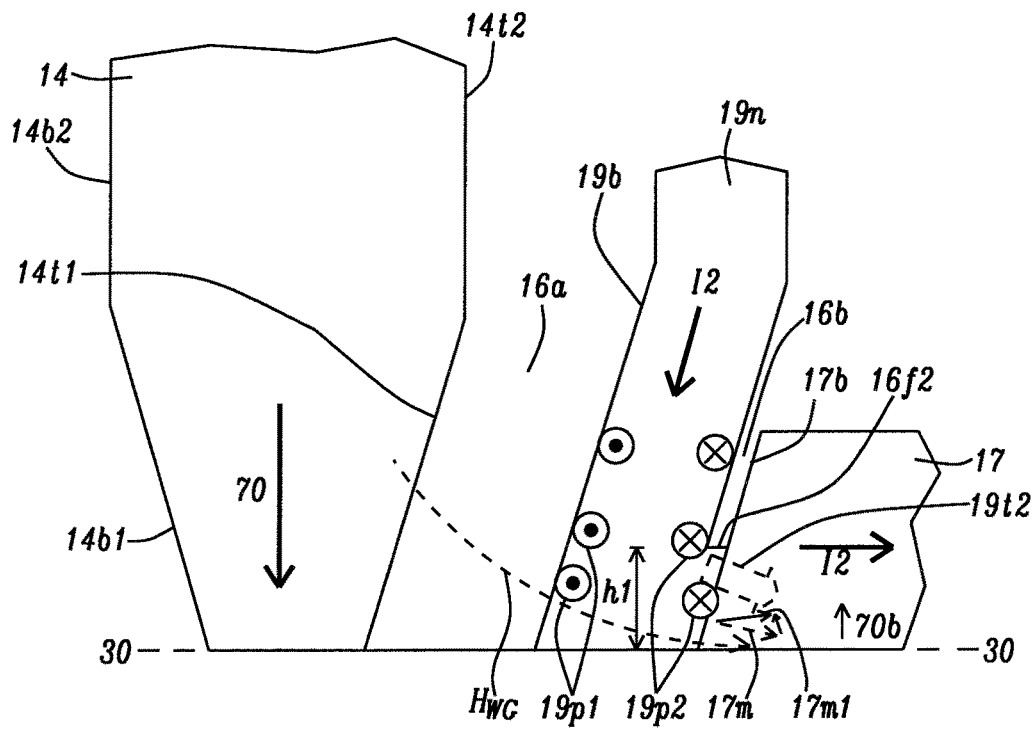
FIG. 13A and FIG. 13B are alternative embodiments to FIG. 9A and FIG. 9B, respectively, where the (−) SHE layer adjoins a portion of the TS but is separated from the MP by the write gap so that transverse spin transfer torque is applied only to a local TS magnetization at the interface with the SHE layer.
Figure 13B:
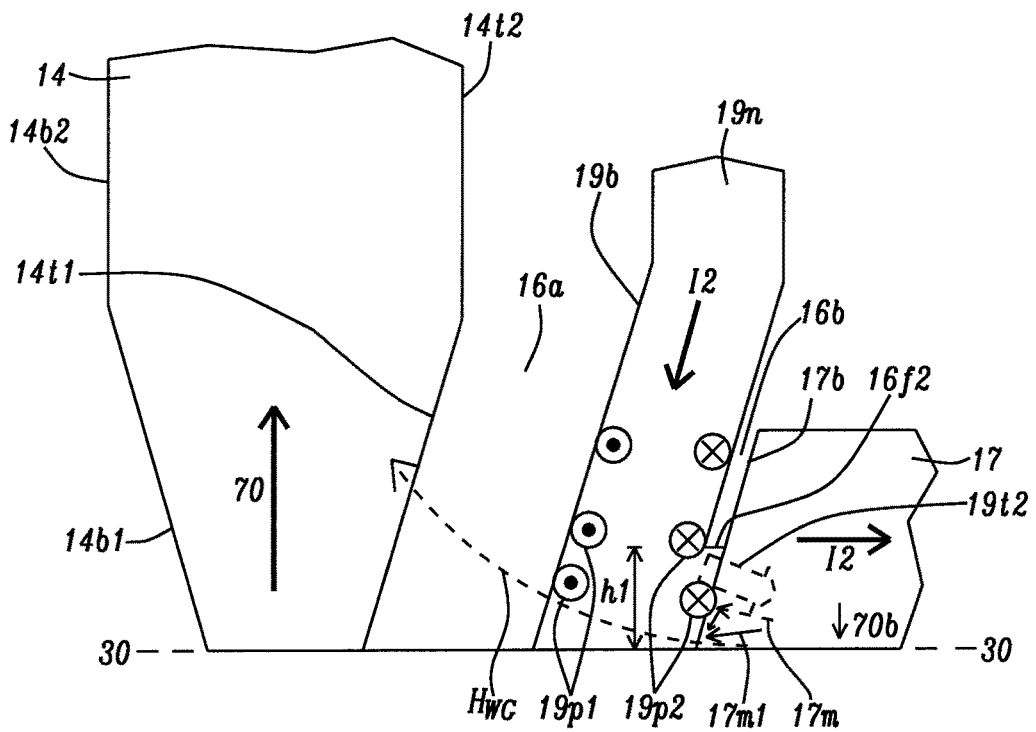

Referring to FIGS. 13A-13B, an alternative embodiment is depicted where SHE layer 19 in FIG. 12A and FIG. 12B, respectively, is replaced with SHE layer 19n that is made of a negative giant SHA material. All other features of the embodiments shown in FIGS. 12A-12B are retained in FIGS. 13A-13B except current $I_2$ is applied from SHE layer 19n to TS 17 before returning to the direct current source through lead 57b described earlier. The current direction for $I_2$ is maintained in FIG. 13B compared with FIG. 13A even though the direction of return field 70b is up (away from the ABS) in FIG. 13A, and down in FIG. 13B. There is no transverse spin transfer torque applied to MP 14 since lower WG layer 16a completely separates SHE layer bottom surface 19b from MP trailing side 14t1, and prevents spin polarized current from flowing to the MP. Accordingly, only return field 70b is enhanced and there is no assist to boosting the write field 70.

Figure 14A:
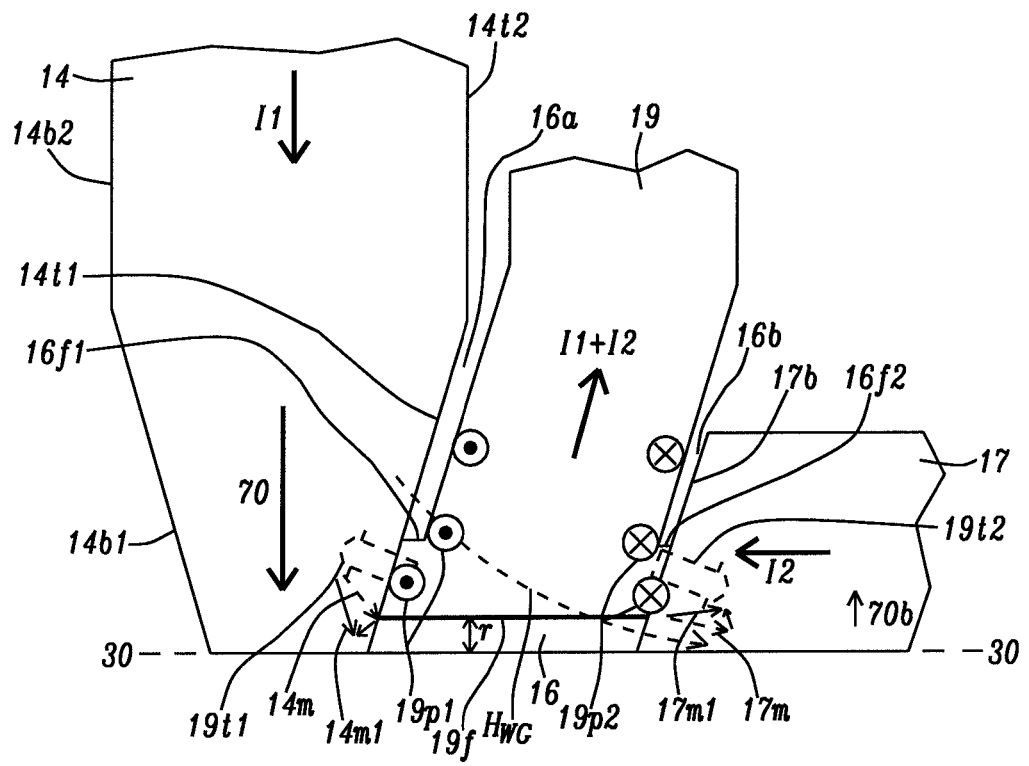
FIG. 14A and FIG. 14B are alternative embodiments to FIG. 7A and FIG. 7B, respectively, where the (+) SHE layer has a front side recessed behind the ABS.
Figure 14B:
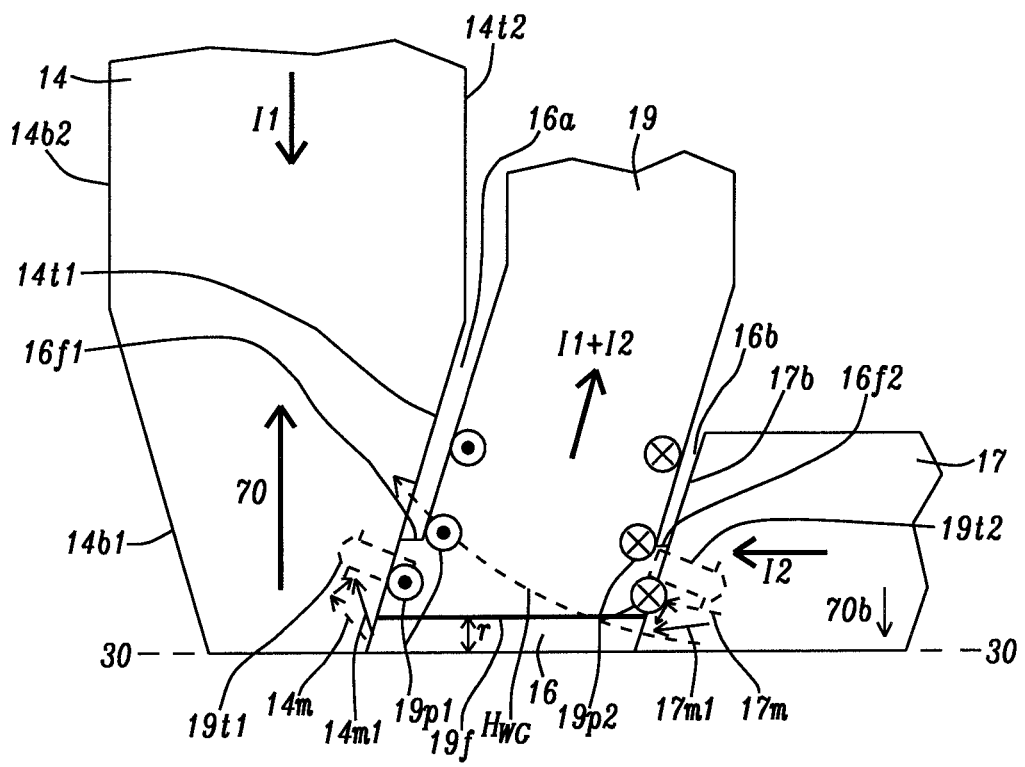

The present disclosure also encompasses an embodiment illustrated in FIGS. 14A-14B where SHE layer 19 in the first embodiment is modified to have front side 19f that is recessed to height r from the ABS 30-30. Here, WG layers 16a and 16b, when made of the same dielectric material, may be combined and shown as WG 16 between the ABS and the SHE layer front side. This embodiment retains the features and benefits of the first embodiment where transverse spin transfer torque 19t1 is generated with current $I_1$ and tilts local MP magnetization 14m to a direction that enhances the write field 70. Moreover, transverse spin transfer torque 19t2 is generated with current $I_2$ and tilts local TS magnetization 17m to a direction that enhances the return field 70b.

Figure 15A:
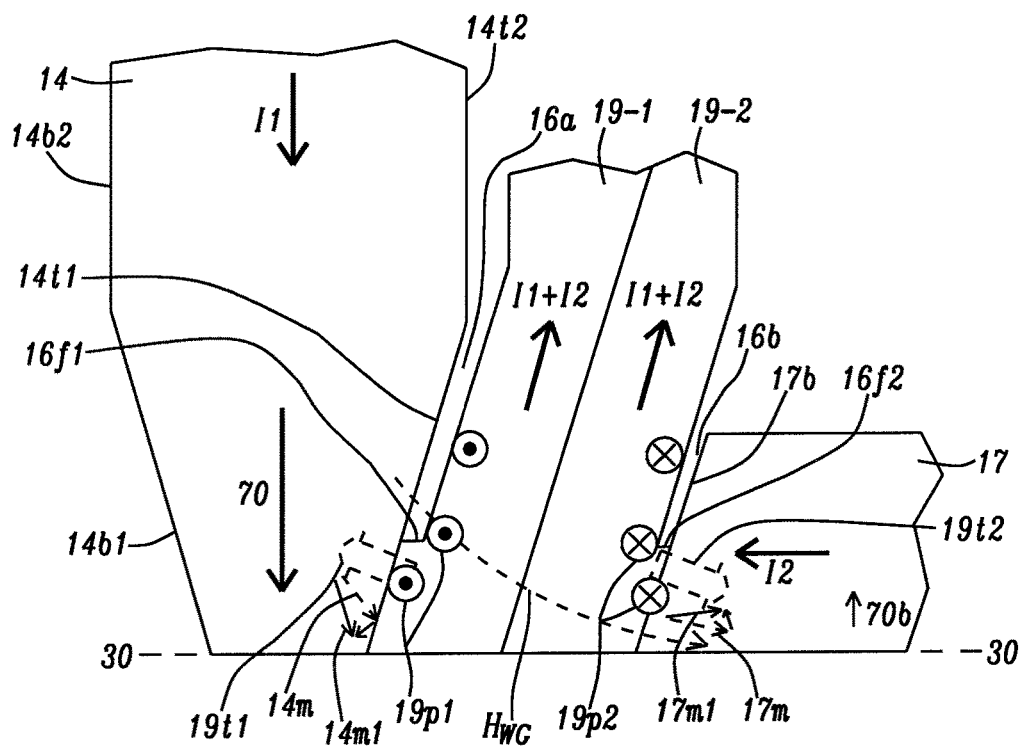
FIG. 15A and FIG. 15B are alternative embodiments to FIG. 7A and FIG. 7B, respectively, where the (+) SHE layer is comprised of a first sub-layer that contacts the MP, and a second sub-layer that adjoins the TS.
Figure 15B:
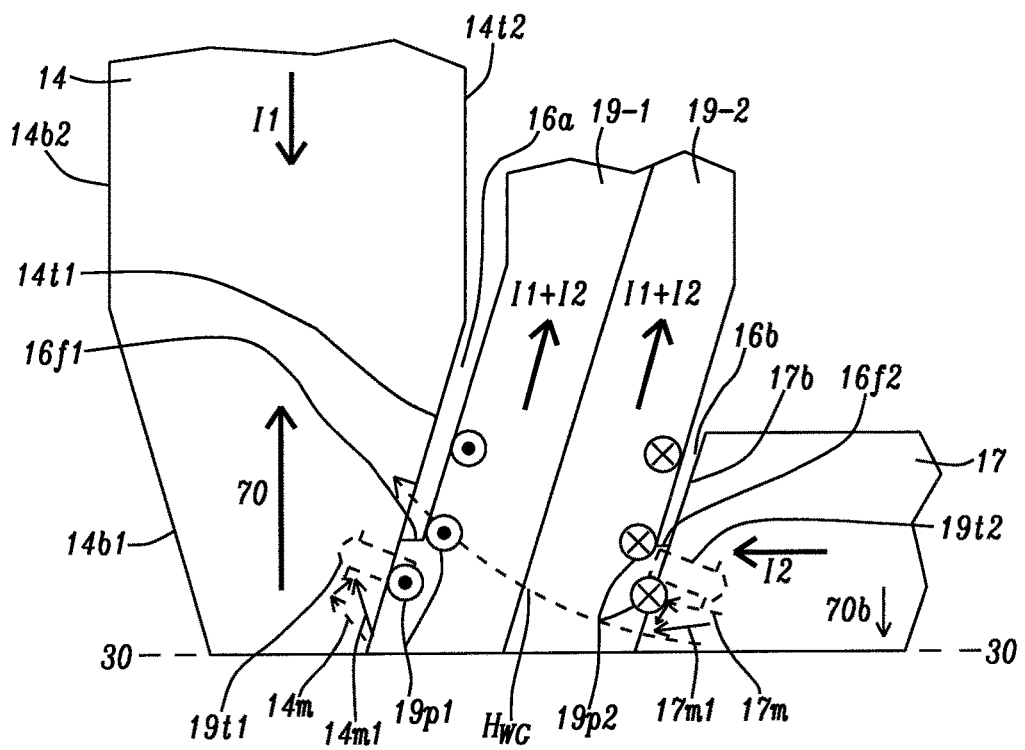

According to another embodiment illustrated in FIGS. 15A-15B, SHE layer 19 from the first embodiment may be comprised of a stack of at least two layers wherein a lower SHE sub-layer 19-1 adjoins a front portion of MP trailing side 14t1, and an upper SHE sub-layer 19-2 contacts a front portion of TS bottom surface 17b. A key feature is that SHE sub-layers 19-1, 19-2 are comprised of different positive giant SHA materials so that the current density in each sub-layer may be tuned. For example, SHE sub-layer 19-1 may have a larger SHA than SHE sub-layer 19-2 so that transverse spin transfer torque 19t1 is greater than transverse spin transfer torque 19t2 when the $I_1$ current density is equal to the $I_2$ current density. Although the exemplary embodiment represents a modification of the first embodiment, SHE layer 19 (or SHE layer 19n) in the other embodiments may be a multilayer as well. Thus, lower SHE sub-layer 19-1 generates transverse spin transfer torque on local MP magnetization 14m when the lower SHE sub-layer contacts the MP trailing side, and thereby provides an assist to the magnetic recording process by enhancing the write field 70. Also, upper SHE sub-layer 19-2 produces transverse spin transfer torque 19t2 on the local TS magnetization 17m when the upper SHE sub-layer adjoins the TS bottom surface, and provides an assist by boosting the return field 70b.

Figure 16:
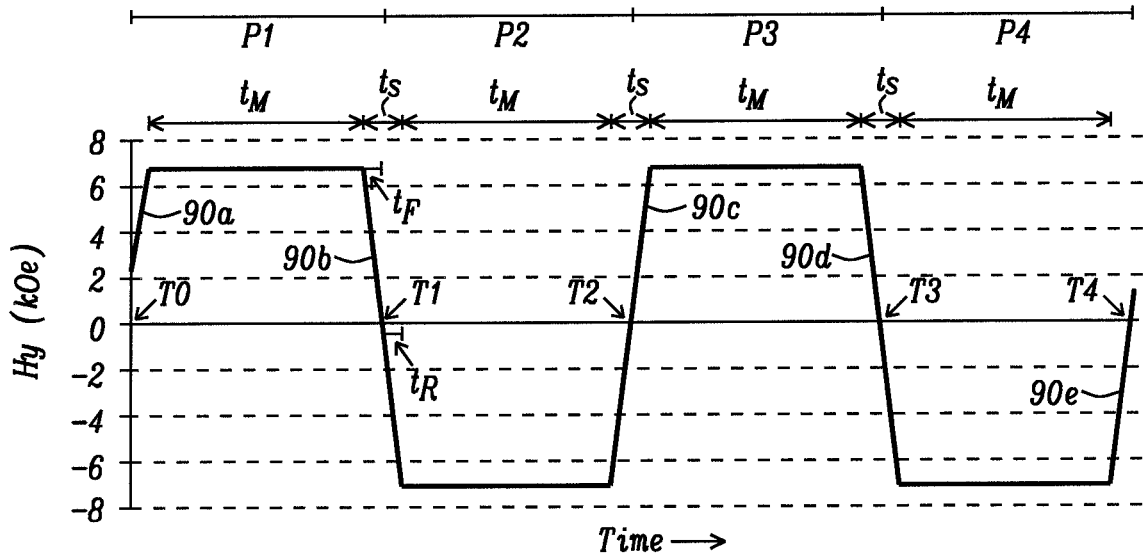
FIG. 16 shows switching time including fall time and rise time during the transition from writing one bit to the next bit.

In all embodiments, the constant direct current in the SHE layer 19 or 19n is around 1-6 mA zero-to-peak amplitude (AMP). Ideally, the write current ($I_w$) waveform used to generate write field 70 is a step transition at each of transition T0-T4 between write periods P1-P4 (FIG. 16) in the absence of a SHAMR assist involving SHE technology described in the embodiments of the present disclosure. However, as shown in FIG. 16, during a typical Iw (+) to (−) polarity transition or during a (−) to (+) polarity transition, the writer has a finite fall time ($t_F$) and finite rise time ($t_R$) between periods ($t_M$) where a maximum Hy field is realized and the MP write field is orthogonal to the ABS (not shown). As a result, each switching period is represented in the Iw waveform by slopes 90a-90e that are non-vertical. Without a SHAMR assist, MP magnetization will follow the Iw transition, but with a finite time delay ($t_R$), usually at the sub-nanosecond time scale. After each of T0-T4, MP write field 70 as in FIG. 6B, for example, is not switched to an opposite direction from the previous write period until the end of $t_R$.

However, when there is a SHAMR assist with a positive giant SHA material depicted in FIGS. 7A-7B, for example, spin current is built up and is generating transverse spin torque 19t1 to rotate local MP magnetization 14m toward the ABS 30-30 within 1 to tens of picoseconds after the write current $I_w$ direction (not shown) is reversed. Accordingly, transverse spin torque works together with the $I_w$ induced field to flip the MP write field direction thereby yielding a shorter rise time ($t_R$), which means each of the slopes 90a-90e in FIG. 16 will be more vertical than when no SHAMR assist is applied. Each of the other SHAMR embodiments described herein also provides a decreased rise time.

In actual practice, there is an overshoot in $I_w$ immediately after a transition to ensure a fast rise time in a conventional PMR writer. Using a SHAMR assist according to an embodiment of the present disclosure, an overshoot in current through the SHE layers would increase transverse spin torque as well. Faster rise time with a SHAMR assist will improve the writer's transition speed and provide better transition sharpness as an additional advantage to enhancing the MP write field, and boosting the TS return field in certain embodiments.

A simulation was performed to demonstrate the benefits of the present disclosure according to the embodiment shown in FIG. 7A where spin polarization of current $I_1$ in SHE layer 19 produces transverse spin transfer torque 19t1 that tilts local MP magnetization 14m to become local MP magnetization 14m1. The tilt is quantified by angle $\theta_1$ shown in FIG. 17C. Similarly, spin polarization of current $I_2$ in the SHE layer produces transverse spin transfer torque 19t2 that tilts local TS magnetization 17m to become local TS magnetization 17m1 with a resulting tilt angle $\theta_2$. The parameters used for the simulation are a SHA=0.2 for the SHE layer and a SHE layer thickness d<12 nm.

Figure 17A:
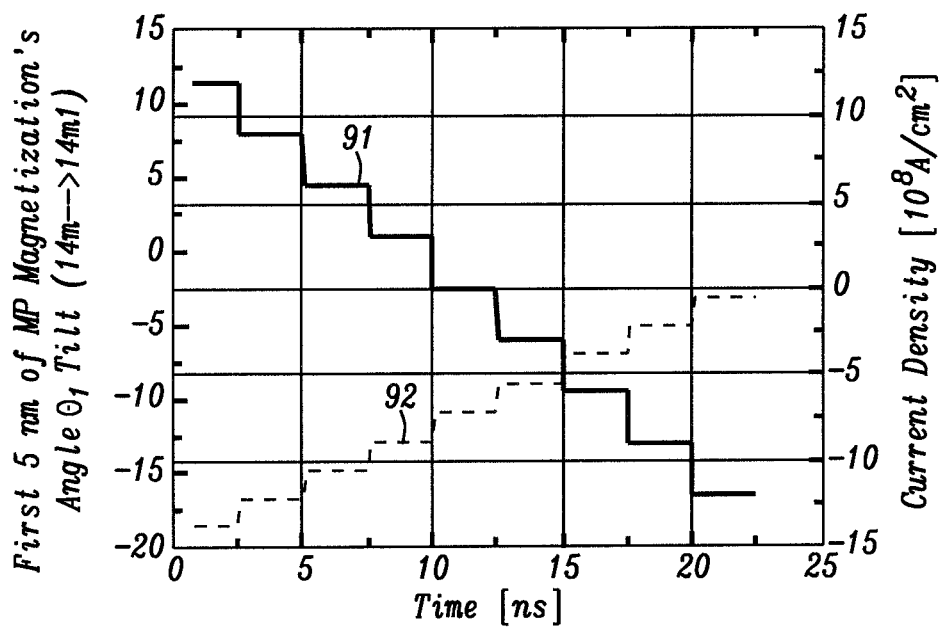
FIGS. 17A-17B are plots of local MP magnetization and local TS magnetization tilt angle $\theta_1$ and $\theta_2$, respectively, as a function of time and current density.
Figure 17B:
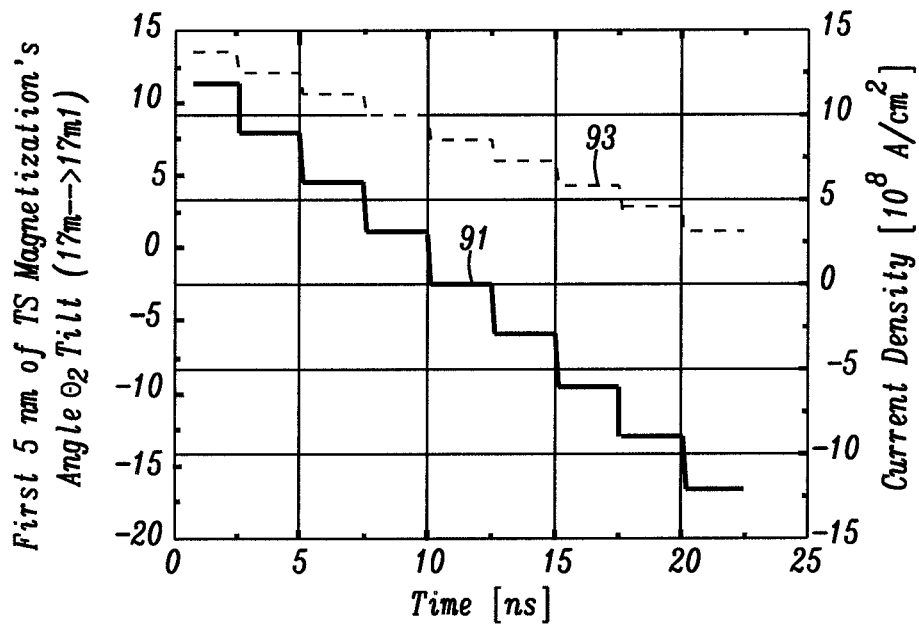

Referring to FIG. 17A and FIG. 17B, the current density as shown in curve 91 was scanned from $+12\times10^8$ Amps/cm$^2$ in steps of $3\times10^8$ Amps/cm$^2$ to $-12\times10^8$ Amps/cm$^2$. A duration of 0.1 ns for a linear transition is applied between two adjacent current densities and each current density has a duration of 2.4 ns. The final statistics of magnetization rotation is applied to the first 5 nm of the MP and TS into their respective interfaces with the SHE layer. Curve 92 in FIG. 17A shows angle $\theta_1$ of averaged magnetization for the first 5 nm of the MP while curve 93 in FIG. 17B depicts angle $\theta_2$ of averaged magnetization for the first 5 nm of the TS. At zero current density, the first 5 nm of the local MP magnetization is tilted by about 12 degrees from normal to the WG (parallel to ABS) towards the out of ABS (down) direction, which means a negative value in FIG. 17A. Meanwhile, at zero current density, the local TS magnetization is tilted around 8 degrees towards the into the ABS (up) direction corresponding to a positive value in FIG. 17B.

Figure 17C:
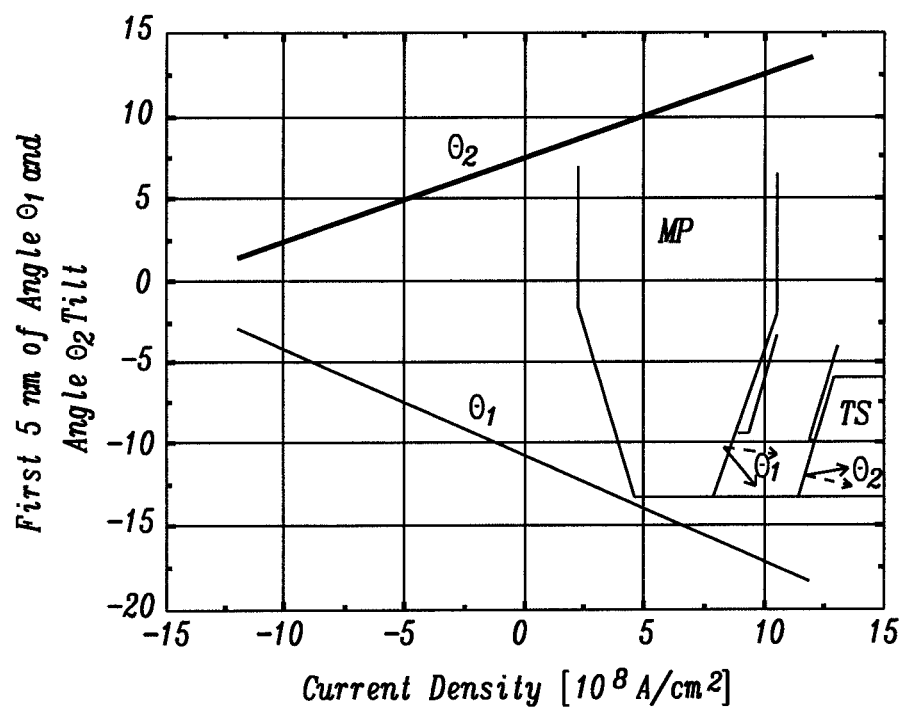
FIG. 17C shows $\theta_1$ and $\theta_2$ as a function of current density.

FIG. 17C indicates that with a change in applied current from $-12\times10^8$ Amps/cm$^2$ to $+12\times10^8$ Amps/cm$^2$, the first 5 nm of the local MP magnetization is tilted further downward with an increase in the absolute value of $\theta_1$ of 0.65 degree per $1\times10^8$ Amps/cm$^2$ change in current density. Furthermore, the first 5 nm of local TS magnetization is tilted further towards the up direction with an increase in $\theta_2$ of 0.52 degree per $1\times10^8$ Amps/cm$^2$ current density. These results are a quantitative estimation of the magnetic recording assist mentioned previously. It is noted that the tilt angles quickly follow the current density change, and there is essentially no time delay in the $\theta_1$ and $\theta_2$ tilt as a function of current density change. Even during the 0.1 ns transition time between each adjacent current density, tilt angles $\theta_1$ and $\theta_2$ closely follow a linear dependence vs. current density. This result indicates that the SHAMR effect's rise time is substantially less than 0.1 nanosecond (ns), which is consistent with the theoretical estimation of 1 picosecond (ps) to a plurality of ps.

Figure 18:
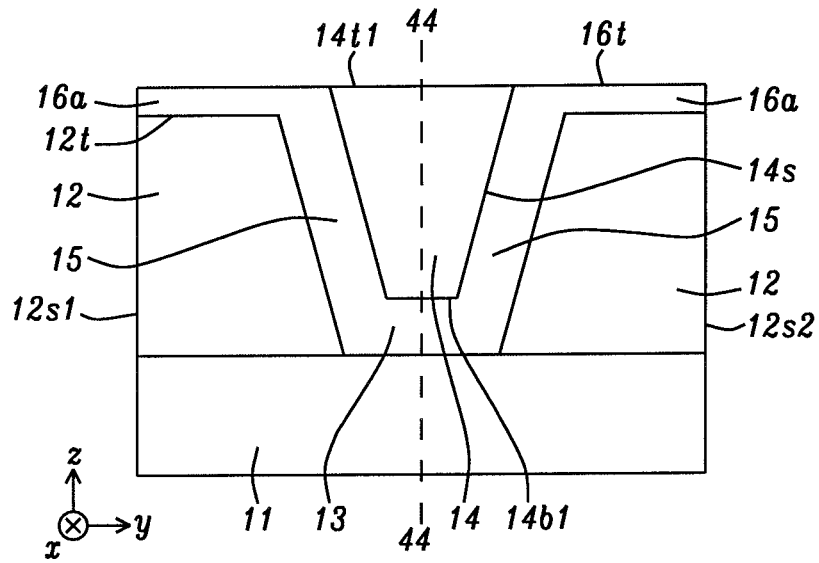
FIGS. 18-20 depict ABS views of a process flow where a SHE layer is formed between a MP trailing side and TS bottom surface according to an embodiment of the present disclosure.
Figure 19:
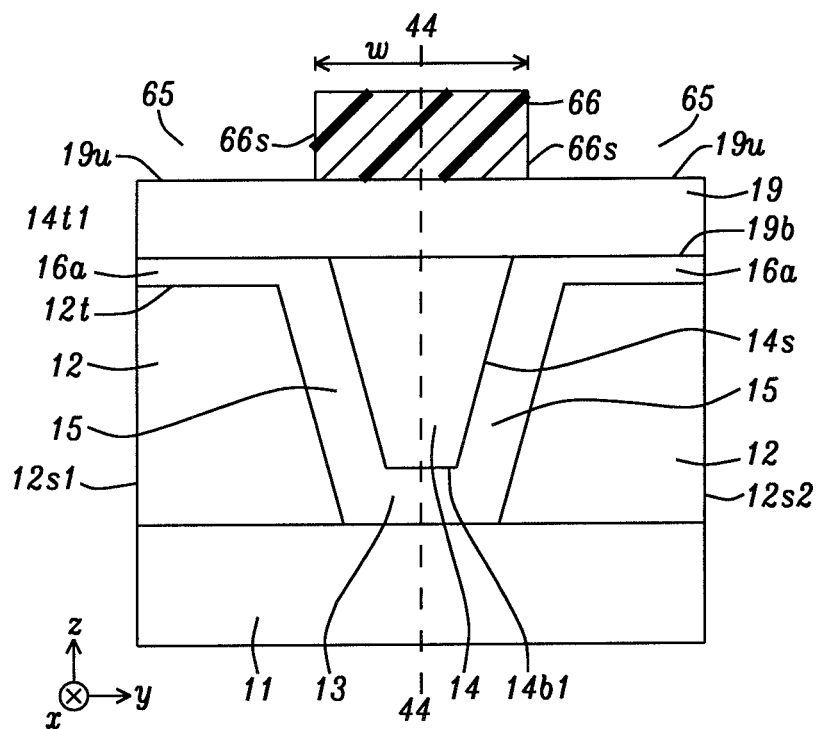
Figure 20:
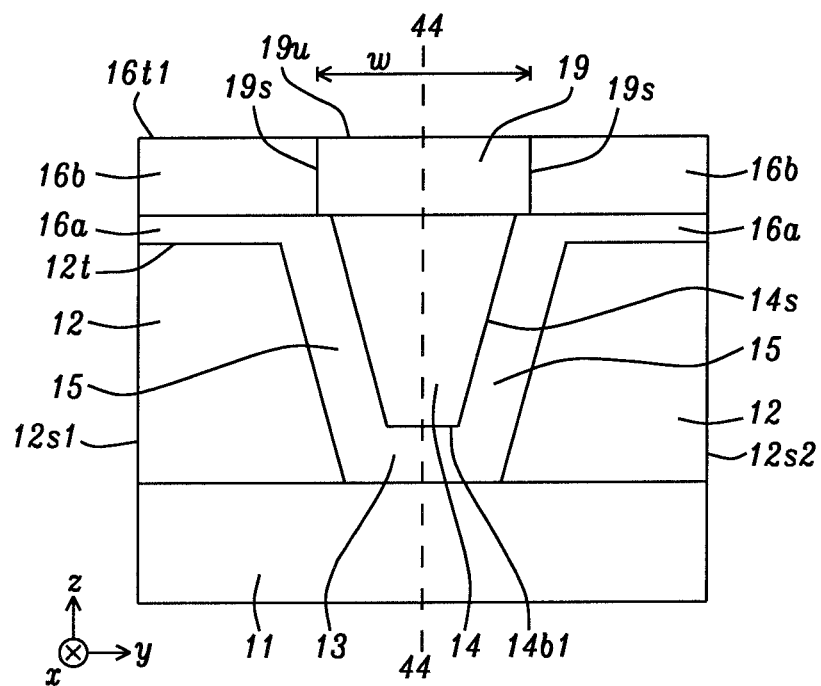

The present disclosure also encompasses a process sequence for fabricating a SHE layer in a write gap according to an embodiment described herein and is provided in the ABS views of FIGS. 18-20. The partially formed SHAMR device comprising MP 14 that adjoins side gaps 15 and leading gap 13 in FIG. 18 is provided according to a conventional process sequence. Side shield top surfaces 12t are covered with WG layer 16a having top surface 16t that is coplanar with a front edge of the MP tapered trailing side 14t1. Side shields 12 have an outer side 12s1 and 12s2 on opposite sides of center plane 44-44.

Referring to FIG. 19, SHE layer 19 (or SHE layer 19n in alternative embodiments) having bottom surface 19b and top surface 19u is deposited on MP trailing side 14t1 and on top surface 16t of WG layer 16a. Thereafter, a photoresist layer is coated on the SHE layer and is patternwise exposed and developed to provide a photoresist mask 66 with sides 66s and a cross-track width w that is bisected by plane 44-44. There is an opening 65 adjacent to each photoresist mask side that exposes a portion of the SHE layer top surface. As mentioned earlier, w is preferably ≥TW where TW is the track width of the MP trailing side.

In FIG. 20, the photoresist mask pattern is etch transferred through exposed regions of SHE layer 19 using a reactive ion etch (RIE) or ion beam etch (IBE) process, for example, and stops on the top surface of WG layer 16a. The photoresist mask is removed with a conventional process. Then, WG layer 16b is deposited with a physical vapor deposition process or the like. A planarization method may be used to form a WG layer top surface 16t1 that is coplanar with SHE layer top surface 19u. A conventional sequence of steps is followed including depositing TS 17 on WG layer 16b and SHE layer 19, and then forming overlying layers in the write head before a lapping process is performed to yield the PMR writer shown in FIG. 6A with a SHAMR configuration.

In all SHAMR device embodiments described herein, kilo flux change per inch (kFCI) and area density capability (ADC) are expected to improve with one or both of MP write field enhancement (better overwrite property), and enhanced TS return field (better BER).

While the present disclosure has been particularly shown and described with reference to, the preferred embodiments thereof, it will be understood by those skilled in the art that various changes in form and details may be made without departing from the spirit and scope of this disclosure.

We claim:

1. A Spin Hall Effect (SHE) assisted magnetic recording (SHAMR) device, comprising:
    (a) a main pole (MP) configured to generate a magnetic (write) field in a MP tip with a front side at an air bearing surface (ABS), and having a local magnetization that is proximate to a MP trailing side and substantially in a direction of a write gap (WG) flux field that is between the MP tip and a trailing shield, and across an adjoining WG;
    (b) the trailing shield (TS) with a front side at the ABS, and a local magnetization proximate to a bottom surface that faces the MP, and that is substantially in a direction of the WG flux field; and
    (c) a Spin Hall Effect (SHE) layer formed in the WG and having a bottom surface that contacts the MP trailing side and a top surface adjoining the TS bottom surface, and comprised of a Spin Hall Angle (SHA) material, wherein the SHE layer is configured to generate a first transverse spin transfer torque that tilts the local MP magnetization to a direction that is more orthogonal to the ABS thereby enhancing the write field when a first current ($I_1$) is applied between the MP trailing side and the SHE layer, and is configured to generate a second transverse spin transfer torque that tilts the local TS magnetization to a direction that is more orthogonal to the ABS to increase a TS return field when a second current ($I_2$) is applied between the TS and the SHE layer.

2. The SHAMR device of claim 1 wherein the SHE layer has a down-track thickness less than 12 nm between the MP trailing side and TS bottom surface.

3. The SHAMR device of claim 1, wherein said SHAMR device is configured to apply $I_1$ from the MP trailing side to the SHE layer, and to apply $I_2$ from the TS to the SHE layer when the SHE layer is comprised of a positive giant SHA material having an absolute value for SHA that is >0.05.

4. The SHAMR device of claim 1, wherein said SHAMR device is configured to apply $I_1$ from the SHE layer to the MP trailing side, and to apply $I_2$ from the SHE layer to the TS when the SHE layer is comprised of a negative giant SHA material having an absolute value for SHA that is >0.05.

5. The SHAMR device of claim 1, wherein the SHE layer has a front side at the ABS.

6. The SHAMR device of claim 5, wherein the SHE layer contacts a portion of the MP trailing side from the ABS to a height (h), and the SHE layer contacts a portion of the TS bottom surface from the ABS to a height (h1) where both of h and h1 are from 10 nm to 70 nm.

7. The SHAMR device of claim 1 wherein the SHE layer has a front side that is recessed from the ABS, and is separated from the ABS by a portion of the write gap.

8. The SHAMR device of claim 1, wherein said SHAMR device is configured such that $I_1$ and $I_2$ have no threshold current density requirement in order to generate the first and second transverse spin transfer torque, respectively.

9. The SHAMR device of claim 1 wherein the SHE layer is comprised of at least first and second sub-layers wherein the first SHE sub-layer is made of a different giant SHA material than the second SHE sub-layer, and wherein the first SHE sub-layer contacts the MP trailing side and is configured to generate the first transverse spin transfer torque, and the second SHE sub-layer adjoins the TS bottom surface and is configured to generate the second transverse spin transfer torque.

10. The SHAMR device of claim 9, wherein said SHAMR device is configured so that the first SHE sub-layer has a greater absolute value for SHA than the second SHE sub-layer, and the first transverse spin torque is larger than the second transverse spin transfer torque when an $I_1$ current density is equal to an $I_2$ current density.

11. The SHAMR device of claim 1, wherein the $I_1$ and $I_2$ are applied from a direct current (dc) source, and flow through a first lead and second lead between the dc source and the MP and TS, respectively, and flow through a third lead between a back portion of the SHE layer and the dc source.

12. The SHAMR device of claim 1 wherein the SHE layer has a backside that is a greater distance from the ABS than a throat height of the trailing shield.

13. A head gimbal assembly (HGA), comprising:
    (a) the SHAMR device of claim 1; and
    (b) a suspension that elastically supports the SHAMR device, wherein the suspension has a flexure to which the SHAMR device is joined, a load beam with one end connected to the flexure, and a base plate connected to the other end of the load beam.

14. A magnetic recording apparatus, comprising:
    (a) the HGA of claim 13;
    (b) a magnetic recording medium positioned opposite to a slider on which the SHAMR device is formed;
    (c) a spindle motor that rotates and drives the magnetic recording medium; and
    (d) a device that supports the slider, and that positions the slider relative to the magnetic recording medium.

* * * * *